(12) United States Patent
Camilleri et al.

(10) Patent No.: US 8,483,439 B2
(45) Date of Patent: *Jul. 9, 2013

(54) VISION SYSTEM FOR VEHICLE

(75) Inventors: Joseph Camilleri, Brighton, MI (US);
Joel S. Gibson, Linden, MI (US);
Kenneth Schofield, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,100

(22) Filed: May 25, 2012

(65) Prior Publication Data

US 2012/0236150 A1    Sep. 20, 2012

Related U.S. Application Data

(63) Continuation of application No. 13/017,353, filed on Jan. 31, 2011, now Pat. No. 8,189,871, which is a continuation of application No. 11/239,980, filed on Sep. 30, 2005, now Pat. No. 7,881,496.

(60) Provisional application No. 60/628,709, filed on Nov. 17, 2004, provisional application No. 60/614,644, filed on Sep. 30, 2004.

(51) Int. Cl.
*G06K 9/00* (2006.01)

(52) U.S. Cl.
USPC ........... 382/104; 348/148; 340/988; 340/904; 340/933; 725/105

(58) Field of Classification Search
None
See application file for complete search history.

(56) References Cited

U.S. PATENT DOCUMENTS

| 2,632,040 | A | 3/1953 | Rabinow |
| 2,827,594 | A | 3/1958 | Rabinow |
| 3,349,394 | A | 10/1967 | Carver |
| 3,601,614 | A | 8/1971 | Platzer |
| 3,612,666 | A | 10/1971 | Rabinow |

(Continued)

FOREIGN PATENT DOCUMENTS

| EP | 0426503 | 5/1991 |
| EP | 0492591 | 7/1992 |

(Continued)

OTHER PUBLICATIONS

National Technical Report vol. 34, No. 3, Jun. 1988.

*Primary Examiner* — David Zarka
*Assistant Examiner* — Sean Motsinger
(74) *Attorney, Agent, or Firm* — Gardner, Linn, Burkhart & Flory, LLP

(57) ABSTRACT

A vision system for a vehicle includes an imaging device, a camera controller, a display device and a display controller. The camera controller and the display controller share a common processor. The vision system is operable to adjust a displayed image responsive to a signal from an auxiliary sensing system. The vision system, responsive to object detection by a sensor, is operable to (a) provide enhanced imaging of the detected object, (b) provide enhanced processing of at least a portion of captured image that corresponds to the region of the exterior scene at which an object is detected, (c) adjust the display device to enhance displayed images of a detected object, and/or (d) adjust the display device to enhance display of at least a portion of a captured image that corresponds to the region of the exterior scene at which the object is detected by the sensor.

16 Claims, 7 Drawing Sheets

U.S. PATENT DOCUMENTS

| | | | |
|---|---|---|---|
| 3,665,224 A | 5/1972 | Kelsey | |
| 3,680,951 A | 8/1972 | Jordan | |
| 3,689,695 A | 9/1972 | Rosenfield et al. | |
| 3,708,231 A | 1/1973 | Walters | |
| 3,746,430 A | 7/1973 | Brean | |
| 3,807,832 A | 4/1974 | Castellion | |
| 3,811,046 A | 5/1974 | Levick | |
| 3,813,540 A | 5/1974 | Albrecht | |
| 3,862,798 A | 1/1975 | Hopkins | |
| 3,947,095 A | 3/1976 | Moultrie | |
| 3,962,600 A | 6/1976 | Pittman | |
| 3,985,424 A | 10/1976 | Steinacher | |
| 3,986,022 A | 10/1976 | Hyatt | |
| 4,037,134 A | 7/1977 | Löper | |
| 4,052,712 A | 10/1977 | Ohama et al. | |
| 4,093,364 A | 6/1978 | Miller | |
| 4,111,720 A | 9/1978 | Michel et al. | |
| 4,161,653 A | 7/1979 | Bedini | |
| 4,200,361 A | 4/1980 | Malvano | |
| 4,214,266 A | 7/1980 | Myers | |
| 4,218,698 A | 8/1980 | Bart et al. | |
| 4,225,886 A * | 9/1980 | Smith | 348/211.1 |
| 4,236,099 A | 11/1980 | Rosenblum | |
| 4,247,870 A | 1/1981 | Gabel et al. | |
| 4,249,160 A | 2/1981 | Chilvers | |
| 4,266,856 A | 5/1981 | Wainwright | |
| 4,277,804 A | 7/1981 | Robison | |
| 4,281,898 A | 8/1981 | Ochiai et al. | |
| 4,288,814 A | 9/1981 | Talley et al. | |
| 4,355,271 A | 10/1982 | Noack | |
| 4,357,558 A | 11/1982 | Massoni et al. | |
| 4,381,888 A | 5/1983 | Momiyama | |
| 4,420,238 A | 12/1983 | Felix | |
| 4,431,896 A | 2/1984 | Lodetti | |
| 4,443,057 A | 4/1984 | Bauer | |
| 4,460,831 A | 7/1984 | Oettinger et al. | |
| 4,481,450 A | 11/1984 | Watanabe et al. | |
| 4,491,390 A | 1/1985 | Tong-Shen | |
| 4,512,637 A | 4/1985 | Ballmer | |
| 4,529,275 A | 7/1985 | Ballmer | |
| 4,529,873 A | 7/1985 | Ballmer | |
| 4,546,551 A | 10/1985 | Franks | |
| 4,549,208 A | 10/1985 | Kamejima et al. | |
| 4,571,082 A | 2/1986 | Downs | |
| 4,572,619 A | 2/1986 | Reininger | |
| 4,580,875 A | 4/1986 | Bechtel | |
| 4,600,913 A | 7/1986 | Caine | |
| 4,603,946 A | 8/1986 | Kato | |
| 4,614,415 A | 9/1986 | Hyatt | |
| 4,620,141 A | 10/1986 | McCumber et al. | |
| 4,623,222 A | 11/1986 | Itoh | |
| 4,626,850 A | 12/1986 | Chey | |
| 4,629,941 A | 12/1986 | Ellis | |
| 4,630,109 A | 12/1986 | Barton | |
| 4,632,509 A | 12/1986 | Ohmi | |
| 4,638,287 A | 1/1987 | Umebayashi et al. | |
| 4,647,161 A | 3/1987 | Müller | |
| 4,669,825 A | 6/1987 | Itoh | |
| 4,669,826 A | 6/1987 | Itoh | |
| 4,671,615 A | 6/1987 | Fukada | |
| 4,672,457 A | 6/1987 | Hyatt | |
| 4,676,601 A | 6/1987 | Itoh | |
| 4,690,508 A | 9/1987 | Jacob | |
| 4,692,798 A | 9/1987 | Seko et al. | |
| 4,697,883 A | 10/1987 | Suzuki | |
| 4,701,022 A | 10/1987 | Jacob | |
| 4,713,685 A | 12/1987 | Nishimura et al. | |
| 4,727,290 A | 2/1988 | Smith | |
| 4,731,669 A | 3/1988 | Hayashi et al. | |
| 4,741,603 A | 5/1988 | Miyagi | |
| 4,768,135 A | 8/1988 | Kretschmer et al. | |
| 4,789,904 A | 12/1988 | Peterson | |
| 4,793,690 A | 12/1988 | Gahan | |
| 4,817,948 A | 4/1989 | Simonelli | |
| 4,820,933 A | 4/1989 | Hong | |
| 4,825,232 A | 4/1989 | Howdle | |
| 4,838,650 A | 6/1989 | Stewart | |
| 4,847,772 A | 7/1989 | Michalopoulos et al. | |
| 4,862,037 A | 8/1989 | Farber et al. | |
| 4,867,561 A | 9/1989 | Fujii et al. | |
| 4,871,917 A | 10/1989 | O'Farrell et al. | |
| 4,872,051 A | 10/1989 | Dye | |
| 4,881,019 A | 11/1989 | Shiraishi et al. | |
| 4,882,565 A | 11/1989 | Gallmeyer | |
| 4,886,960 A | 12/1989 | Molyneux | |
| 4,891,559 A | 1/1990 | Matsumoto et al. | |
| 4,892,345 A | 1/1990 | Rachael, III | |
| 4,895,790 A | 1/1990 | Swanson et al. | |
| 4,896,030 A | 1/1990 | Miyaji | |
| 4,907,870 A | 3/1990 | Brucker | |
| 4,910,591 A | 3/1990 | Petrossian et al. | |
| 4,916,374 A | 4/1990 | Schierbeek | |
| 4,917,477 A | 4/1990 | Bechtel et al. | |
| 4,937,796 A | 6/1990 | Tendler | |
| 4,953,305 A | 9/1990 | Van Lente et al. | |
| 4,956,591 A | 9/1990 | Schierbeek | |
| 4,961,625 A | 10/1990 | Wood et al. | |
| 4,967,319 A | 10/1990 | Seko | |
| 4,970,653 A * | 11/1990 | Kenue | 701/301 |
| 4,971,430 A | 11/1990 | Lynas | |
| 4,974,078 A | 11/1990 | Tsai | |
| 4,987,357 A | 1/1991 | Masaki | |
| 4,991,054 A | 2/1991 | Walters | |
| 5,001,558 A | 3/1991 | Burley et al. | |
| 5,003,288 A | 3/1991 | Wilhelm | |
| 5,012,082 A | 4/1991 | Watanabe | |
| 5,016,977 A | 5/1991 | Baude et al. | |
| 5,027,001 A | 6/1991 | Torbert | |
| 5,027,200 A | 6/1991 | Petrossian et al. | |
| 5,044,706 A | 9/1991 | Chen | |
| 5,055,668 A | 10/1991 | French | |
| 5,059,877 A | 10/1991 | Teder | |
| 5,064,274 A | 11/1991 | Alten | |
| 5,072,154 A | 12/1991 | Chen | |
| 5,086,253 A | 2/1992 | Lawler | |
| 5,096,287 A | 3/1992 | Kakinami et al. | |
| 5,097,362 A | 3/1992 | Lynas | |
| 5,121,200 A | 6/1992 | Choi | |
| 5,124,549 A | 6/1992 | Michaels et al. | |
| 5,130,709 A | 7/1992 | Toyama et al. | |
| 5,148,014 A | 9/1992 | Lynam | |
| 5,168,378 A | 12/1992 | Black | |
| 5,170,374 A | 12/1992 | Shimohigashi et al. | |
| 5,172,235 A | 12/1992 | Wilm et al. | |
| 5,177,685 A | 1/1993 | Davis et al. | |
| 5,182,502 A | 1/1993 | Slotkowski et al. | |
| 5,184,956 A | 2/1993 | Langlais et al. | |
| 5,189,561 A | 2/1993 | Hong | |
| 5,193,000 A | 3/1993 | Lipton et al. | |
| 5,193,029 A | 3/1993 | Schofield | |
| 5,204,778 A | 4/1993 | Bechtel | |
| 5,208,701 A | 5/1993 | Maeda | |
| 5,245,422 A | 9/1993 | Borcherts et al. | |
| 5,253,109 A | 10/1993 | O'Farrell | |
| 5,276,389 A | 1/1994 | Levers | |
| 5,285,060 A | 2/1994 | Larson et al. | |
| 5,289,182 A | 2/1994 | Brillard et al. | |
| 5,289,321 A | 2/1994 | Secor | |
| 5,305,012 A | 4/1994 | Faris | |
| 5,307,136 A | 4/1994 | Saneyoshi | |
| 5,313,072 A | 5/1994 | Vachss | |
| 5,325,096 A | 6/1994 | Pakett | |
| 5,325,386 A | 6/1994 | Jewell et al. | |
| 5,329,206 A | 7/1994 | Slotkowski et al. | |
| 5,331,312 A | 7/1994 | Kudoh | |
| 5,336,980 A | 8/1994 | Levers | |
| 5,341,437 A | 8/1994 | Nakayama | |
| 5,351,044 A | 9/1994 | Mathur et al. | |
| 5,355,118 A | 10/1994 | Fukuhara | |
| 5,374,852 A | 12/1994 | Parkes | |
| 5,386,285 A | 1/1995 | Asayama | |
| 5,394,333 A | 2/1995 | Kao | |
| 5,406,395 A | 4/1995 | Wilson et al. | |
| 5,410,346 A | 4/1995 | Saneyoshi et al. | |
| 5,414,257 A | 5/1995 | Stanton | |
| 5,414,461 A | 5/1995 | Kishi et al. | |
| 5,416,313 A | 5/1995 | Larson et al. | |

| Patent | Date | Inventor |
|---|---|---|
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,187 A | 3/1998 | Varaprasad et al. |
| 5,724,316 A | 3/1998 | Brunts |
| 5,737,226 A | 4/1998 | Olson et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A * | 8/1998 | Schofield et al. ......... 250/208.1 |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A * | 8/2000 | Schofield et al. ......... 250/208.1 |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,433,676 B2 | 8/2002 | DeLine et al. |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |

| | | | | | | |
|---|---|---|---|---|---|---|
| 6,636,258 | B2 | 10/2003 | Strumolo | 2004/0051634 A1 | 3/2004 | Schofield et al. |
| 6,648,477 | B2 | 11/2003 | Hutzel et al. | 2004/0128065 A1 | 7/2004 | Taylor et al. |
| 6,650,233 | B2 | 11/2003 | DeLine et al. | 2004/0200948 A1 | 10/2004 | Bos et al. |
| 6,650,455 | B2 | 11/2003 | Miles | 2005/0078389 A1 | 4/2005 | Kulas et al. |
| 6,672,731 | B2 | 1/2004 | Schnell et al. | 2005/0134966 A1 | 6/2005 | Burgner |
| 6,674,562 | B1 | 1/2004 | Miles | 2005/0134983 A1 | 6/2005 | Lynam |
| 6,680,792 | B2 | 1/2004 | Miles | 2005/0146792 A1 | 7/2005 | Schofield et al. |
| 6,690,268 | B2 | 2/2004 | Schofield et al. | 2005/0169003 A1 | 8/2005 | Lindahl et al. |
| 6,700,605 | B1 | 3/2004 | Toyoda et al. | 2005/0195488 A1 | 9/2005 | McCabe et al. |
| 6,704,621 | B1 | 3/2004 | Stein et al. | 2005/0200700 A1 | 9/2005 | Schofield et al. |
| 6,710,908 | B2 | 3/2004 | Miles et al. | 2005/0232469 A1 | 10/2005 | Schofield et al. |
| 6,711,474 | B1 | 3/2004 | Treyz et al. | 2005/0264891 A1 | 12/2005 | Uken et al. |
| 6,714,331 | B2 | 3/2004 | Lewis et al. | 2006/0018511 A1 | 1/2006 | Stam et al. |
| 6,717,610 | B1 | 4/2004 | Bos et al. | 2006/0018512 A1 | 1/2006 | Stam et al. |
| 6,735,506 | B2 | 5/2004 | Breed et al. | 2006/0028731 A1 | 2/2006 | Schofield et al. |
| 6,741,377 | B2 | 5/2004 | Miles | 2006/0050018 A1 | 3/2006 | Hutzel et al. |
| 6,744,353 | B2 | 6/2004 | Sjönell | 2006/0091813 A1 | 5/2006 | Stam et al. |
| 6,757,109 | B2 | 6/2004 | Bos | 2006/0103727 A1 | 5/2006 | Tseng |
| 6,762,867 | B2 | 7/2004 | Lippert et al. | 2006/0164230 A1 | 7/2006 | DeWind et al. |
| 6,794,119 | B2 | 9/2004 | Miles | 2006/0250501 A1 | 11/2006 | Widmann et al. |
| 6,795,221 | B1 | 9/2004 | Urey | 2007/0023613 A1 | 2/2007 | Schofield et al. |
| 6,802,617 | B2 | 10/2004 | Schofield et al. | 2007/0104476 A1 | 5/2007 | Yasutomi et al. |
| 6,822,563 | B2 | 11/2004 | Bos et al. | 2007/0109406 A1 | 5/2007 | Schofield et al. |
| 6,823,241 | B2 | 11/2004 | Shirato et al. | 2007/0109651 A1 | 5/2007 | Schofield et al. |
| 6,824,281 | B2 | 11/2004 | Schofield et al. | 2007/0109652 A1 | 5/2007 | Schofield et al. |
| 6,831,261 | B2 | 12/2004 | Schofield et al. | 2007/0109653 A1 | 5/2007 | Schofield et al. |
| 6,847,487 | B2 | 1/2005 | Burgner | 2007/0109654 A1 | 5/2007 | Schofield et al. |
| 6,882,287 | B2 | 4/2005 | Schofield | 2007/0120657 A1 | 5/2007 | Schofield et al. |
| 6,889,161 | B2 | 5/2005 | Winner et al. | 2007/0176080 A1 | 8/2007 | Schofield et al. |
| 6,891,563 | B2 | 5/2005 | Schofield et al. | 2008/0180529 A1 | 7/2008 | Taylor et al. |
| 6,909,753 | B2 | 6/2005 | Meehan et al. | 2009/0113509 A1 | 4/2009 | Tseng et al. |
| 6,946,978 | B2 | 9/2005 | Schofield | 2010/0045797 A1 | 2/2010 | Schofield et al. |
| 6,953,253 | B2 | 10/2005 | Schofield et al. | | | |
| 6,968,736 | B2 | 11/2005 | Lynam | | | |

FOREIGN PATENT DOCUMENTS

| | | |
|---|---|---|
| EP | 0788947 | 8/1997 |
| FR | 2641237 | 7/1990 |
| JP | 59114139 | 7/1984 |
| JP | 6079889 | 5/1985 |
| JP | 6080953 | 5/1985 |
| JP | 6272245 | 5/1987 |
| JP | 62131837 | 6/1987 |
| JP | 6414700 | 1/1989 |
| JP | 1141137 | 6/1989 |
| JP | 0550883 | 3/1993 |
| JP | 0577657 | 3/1993 |
| JP | 6227318 | 8/1994 |
| JP | 06267304 | 9/1994 |
| JP | 06276524 | 9/1994 |
| JP | 06295601 | 10/1994 |
| JP | 0732936 | 2/1995 |
| JP | 0747878 | 2/1995 |
| JP | 07052706 | 2/1995 |
| JP | 0769125 | 3/1995 |
| JP | 07105496 | 4/1995 |
| JP | 09205414 | 8/1997 |
| WO | WO8605147 | 9/1986 |
| WO | WO9419212 | 9/1994 |
| WO | WO9638319 | 12/1996 |
| WO | WO9735743 | 10/1997 |
| WO | WO9814974 | 4/1998 |
| WO | WO9914088 | 3/1999 |
| WO | WO9923828 | 5/1999 |
| WO | WO2004047421 | 6/2004 |
| WO | WO2004103772 | 12/2004 |
| WO | WO2005019873 | 3/2005 |
| WO | WO2007081407 | 7/2007 |
| WO | WO2007111984 | 10/2007 |
| WO | WO2009073054 | 6/2009 |

Additional U.S. Patent Documents:

| | | | |
|---|---|---|---|
| 7,004,593 B2 | 2/2006 | Weller et al. | |
| 7,005,974 B2 | 2/2006 | McMahon et al. | |
| 7,038,577 B2 | 5/2006 | Pawlicki et al. | |
| 7,085,637 B2 | 8/2006 | Breed et al. | |
| 7,092,548 B2 | 8/2006 | Laumeyer et al. | |
| 7,116,246 B2 | 10/2006 | Winter et al. | |
| 7,202,776 B2 | 4/2007 | Breed | |
| 7,227,459 B2 | 6/2007 | Bos et al. | |
| 7,311,406 B2 | 12/2007 | Schofield et al. | |
| 7,325,934 B2 | 2/2008 | Schofield et al. | |
| 7,325,935 B2 | 2/2008 | Schofield et al. | |
| 7,339,149 B1 | 3/2008 | Schofield et al. | |
| 7,344,261 B2 | 3/2008 | Schofield et al. | |
| 7,380,948 B2 | 6/2008 | Schofield et al. | |
| 7,388,182 B2 | 6/2008 | Schofield et al. | |
| 7,402,786 B2 | 7/2008 | Schofield et al. | |
| 7,423,248 B2 | 9/2008 | Schofield et al. | |
| 7,425,076 B2 | 9/2008 | Schofield et al. | |
| 7,459,664 B2 | 12/2008 | Schofield et al. | |
| 7,526,103 B2 | 4/2009 | Schofield et al. | |
| 7,561,181 B2 | 7/2009 | Schofield et al. | |
| 7,616,781 B2 | 11/2009 | Schofield et al. | |
| 7,619,508 B2 | 11/2009 | Lynam et al. | |
| 7,720,580 B2 | 5/2010 | Higgins-Luthman | |
| 8,189,871 B2 | 5/2012 | Camilleri et al. | |
| 2002/0003571 A1* | 1/2002 | Schofield et al. | 348/148 |
| 2002/0015153 A1 | 2/2002 | Downs | |
| 2002/0044065 A1 | 4/2002 | Quist et al. | |
| 2002/0113873 A1 | 8/2002 | Williams | |
| 2002/0159270 A1 | 10/2002 | Lynam et al. | |
| 2003/0137586 A1 | 7/2003 | Lewellen | |
| 2003/0222982 A1 | 12/2003 | Hamdan et al. | |
| 2003/0227777 A1 | 12/2003 | Schofield | |
| 2004/0012488 A1 | 1/2004 | Schofield | |
| 2004/0016870 A1 | 1/2004 | Pawlicki et al. | |
| 2004/0032321 A1 | 2/2004 | McMahon et al. | |

\* cited by examiner

VISION SYSTEM FOR VEHICLE

CROSS REFERENCE TO RELATED APPLICATIONS

The present application is a continuation of U.S. patent application Ser. No. 13/017,353, filed Jan. 31, 2011, now U.S. Pat. No. 8,189,871, which is a continuation of U.S. patent application Ser. No. 11/239,980, filed Sep. 30, 2005, now U.S. Pat. No. 7,881,496, which claims the benefit of U.S. provisional application Ser. No, 60/628,709, filed Nov. 17, 2004; and Ser. No. 60/614,644, filed Sep. 30, 2004, which are all hereby incorporated herein by reference in their entireties.

FIELD OF THE INVENTION

The present invention relates to imaging systems for vehicles, and, more particularly, to reverse aid imaging systems with a rearward facing imaging device or camera and a display. However, aspects of the present invention are equally suitable for other vehicle imaging systems, such as side object detection systems, and forward facing imaging systems and the like.

BACKGROUND OF THE INVENTION

The advent of low cost, reliable imaging devices, based on a variety of silicon technologies, and in particular CMOS technology, combined with an improved cost/performance ratio for displays capable of meeting automotive specifications, and an increasing application rate of video monitor displays for automotive navigation systems or as part of the driver interface to a wide variety of vehicle systems, has lead to an increasing use of cameras or imaging sensors designed to give the driver a view of those areas around the vehicle which are not in the normal direct field of view of the driver, typically referred to as "blind spots". These areas include the region close to the front of the vehicle, typically obscured by the forward structure of the vehicle, the region along the passenger side of the vehicle, the region along the driver side of the vehicle rearward of the driver, and the area immediately rearward of the vehicle which cannot be seen directly or indirectly through the rear view mirror system. The camera or imaging sensor may capture an image of the rearward (or sideward or other blind spot area) field of view, and the image may be displayed to the driver of the vehicle to assist the driver in backing up or reversing or otherwise driving or maneuvering the vehicle. The use of electronic cameras in these applications significantly increases the driver's knowledge of the space immediately surrounding the vehicle, which may be of importance prior to and during low speed maneuvers, and thus contributes to the safe completion of such maneuvers. However, in order to provide user controls or user inputs to allow the driver or user to control various functions of the camera at the rear or side or front of the vehicle, additional wiring or connections or communication links may be needed between a control and user input in the vehicle and the camera or imaging device at the rear or side or front of the vehicle.

It is known to provide a headlamp control system having an imaging sensor positioned on a vehicle and having a forward field of view. The system may detect headlamps and taillights in the images captured by the imaging sensor. It is also known to provide a lane departure warning system that includes an imaging sensor positioned on a vehicle and having a forward field of view. The lane departure warning system detects lane markers and the like along the road surface in front of the vehicle and determines when the vehicle is drifting out of the lane, and may provide an alert to the driver of the vehicle when such drifting is detected. Such systems typically are separate systems with different, independently operable controls and image processors and imaging sensors.

SUMMARY OF THE INVENTION

The present invention provides an imaging and display system or vision system for a vehicle that captures images of a scene occurring exteriorly of the vehicle, such as rearward of the vehicle, and displays the captured images at a display device in the vehicle. The imaging and display or vision system includes an imaging device or camera that is positioned at the vehicle with an exterior field of view (such as a rearward field of view) for capturing images of the exterior scene. The display device is positioned within the vehicle and remote from the camera and is operable to display the captured images in the vehicle where they are readily viewable by the driver or occupant of the vehicle. The vision system includes one or more user inputs at the display device and is operable to adjust or control at least one function or mode or feature of the camera in response to actuation of the user input or inputs. The vision system is operable to, communicate imaging signals from the imaging device to the display device and to communicate camera control signals from the display device to the imaging device along common connections or wiring or communication links between the imaging device and the display device.

According to an aspect of the present invention, a vision system for a vehicle includes an imaging device having an imaging sensor, a camera microcontroller, a display device having a display element, a display; microcontroller, and at least one user input selectively actuatable by a user. The user input is selectively actuatable by a user. The imaging device communicates an image signal to the display device via a communication link. The display microcontroller affects the image, signal in response to the at least one user input. The camera microcontroller monitors the image signal on the communication link and adjusts a function of the imaging device in response to a detection of the affected image signal.

The imaging sensor may have a field of view exteriorly of the vehicle, such as rearwardly of the vehicle, for capturing an image of the scene occurring exteriorly of the vehicle. The vision system may include control circuitry at or near or associated with an interior rearview mirror assembly of the vehicle or a windshield electronics module or accessory module of the vehicle.

The display microcontroller may affect the image signal by disabling a video termination at the display device, and the imaging device may stop communicating the image signal when the video termination is disabled. The display microcontroller may selectively apply at least two voltage levels across the communication link in response to at least two user inputs, and the camera microcontroller may adjust a function of the imaging device in response to a respective one of the voltage levels.

The imaging device may include a video encoder that communicates the image signal to the display device via the communication link. The communication link may comprise a video plus and a video return wire.

According to another aspect of the present invention, a vision system for a vehicle includes an imaging device having an imaging sensor, a camera microcontroller, a display device having a display element, a display microcontroller, and at least one user input selectively actuatable by a user. The imaging device communicates an image signal to the display device via a communication link, and the display microcontroller communicates a control signal to the imaging device via the communication link in response to the user input. The camera microcontroller receives the control signal and adjusts a function of the imaging device in response to the control signal. The image signal and the control signal utilize a common link between the imaging device and the display device.

According to another aspect of the present invention, an imaging and display system or vision system may be operable in combination with or in conjunction with an auxiliary or triggering or initial sensing device or system or distance sensing/measuring/determining system. The auxiliary sensing device or system may provide additional sensing areas to cover blind spots that may not be encompassed by the imaging sensor or camera. Optionally, the auxiliary sensing system, such as ultrasonic sensors, radar, lidar, and the like, may detect an object exteriorly of the vehicle, and may determine or measure or detect the distance to the object, whereby the imaging and display system may be adjusted or controlled to provide enhanced imaging of the exterior scene or enhanced processing of the captured images or enhanced displaying of the images of the exterior scene and the detected object, in response to such an object detection by the auxiliary sensing system. For example, the imaging and display system may adjust a camera setting to provide enhanced imaging of the detected object, or may adjust the processor or control to provide enhanced processing of a portion of the image data that corresponds to the region of the scene at which the object was detected, or may adjust the display to highlight or enhance the displayed images of the detected object or of the region of the display that corresponds to the region of exterior scene at which the object was detected.

Therefore, the present invention provides an imaging and display system or vision system that includes an imaging device and a display device connected via video connections or communication links. The imaging device includes user inputs, and the imaging and display system is operable to selectively control or adjust the imaging device in response to the user inputs. The imaging and display system or vision system is operable to communicate imaging signals from the imaging device to the display device and to communicate camera control signals from the display device to the imaging device along common connections or wiring or communication links between the imaging device and the display device. The imaging and display system or vision system thus may provide various optional features or functions or modes without having to change or add wiring or connections between the imaging device and the display device.

The present invention also provides an imaging system or vision system for a vehicle that is operable to capture images of a scene occurring exteriorly of the vehicle, such as forward of the vehicle, and that captures and/or processes selective image data differently than other image data to extract and analyze the desired data for different applications or systems or accessories. The imaging system includes an imaging device or camera that is positioned at the vehicle with an exterior field of view (such as a forward field of view) for capturing images of the exterior scene. The imaging system may be operable to selectively or intermittently capture and/or process some image data in a manner suitable for a lane detection and/or capture and/or process other image data in a manner suitable for headlamp detection and/or to capture and/or process other image data in a manner suitable for ambient light detection and/or other functions, systems or features or the like.

According to another aspect of the present invention, an imaging system for a vehicle includes an image sensor and a control. The image sensor is positioned at a vehicle and has an exterior, field of view. The image sensor is operable to capture images of the exterior field of view and to generate image data. The control is operable to adjust the image sensor to at least two settings, and to process the image data via at least two processing techniques. The control is operable to synchronize the image sensor settings and the processing techniques to extract respective or appropriate information from the captured images for at least two applications of the imaging system.

The image sensor may have a field of view forwardly of the vehicle for capturing an image of the scene occurring forwardly of the vehicle.

The control may adjust the image sensor setting to capture image data suitable for a particular application, and may process those captured images via a processing technique suitable for the particular application. The control may adjust the image sensor to other settings and may correspondingly process those captured images via other processing techniques depending on the desired or appropriate or particular or respective application or function of the imaging system. For example, the control may selectively or intermittently or occasionally adjust the image sensor setting and processing technique to extract information from the captured image data for a headlamp control and/or a lane departure warning system and/or a rain sensor and/or a navigational system and/or an ambient light sensor and/or a collision avoidance system and/or a driving separation indicator and/or a back up aid and/or an object detection system and/or the like.

Therefore, the present invention also provides an imaging system or vision system that includes an imaging sensor and a control that are operable to provide multiple functions or control of multiple accessories or the like via selective capturing of image data and processing of the captured image data. The control is thus operable to selectively capture images and process image data to provide multiple functions or applications with a common image sensor and image processor. The imaging system may synchronize the settings of the image sensor with the processing techniques applied to the image data by the image processor, in order to perform and/or optimize two or more functions of the imaging system. The present invention thus provides a multi-tasking capability to an image sensor and image processor while providing enhanced capturing of the images and processing of the image data for the desired functions or applications.

These and other objects, advantages, purposes and features of the present invention will become apparent upon review of the following specification in conjunction with the drawings.

DESCRIPTION OF THE PREFERRED EMBODIMENTS

Figure 1:
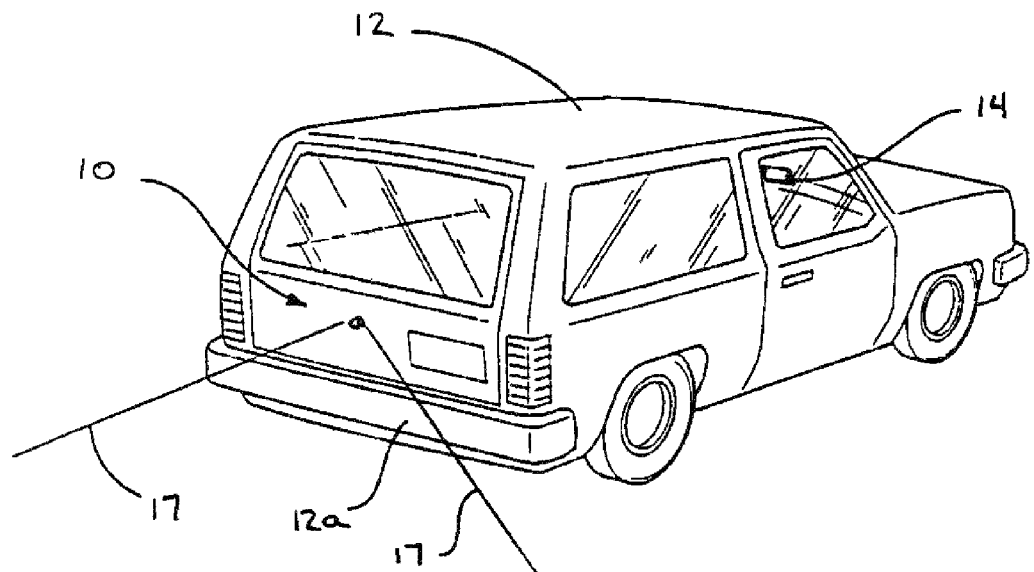
FIG. 1 is a rear perspective view of a vehicle having an imaging and display system thereon in accordance with the present invention.
Figure 2:
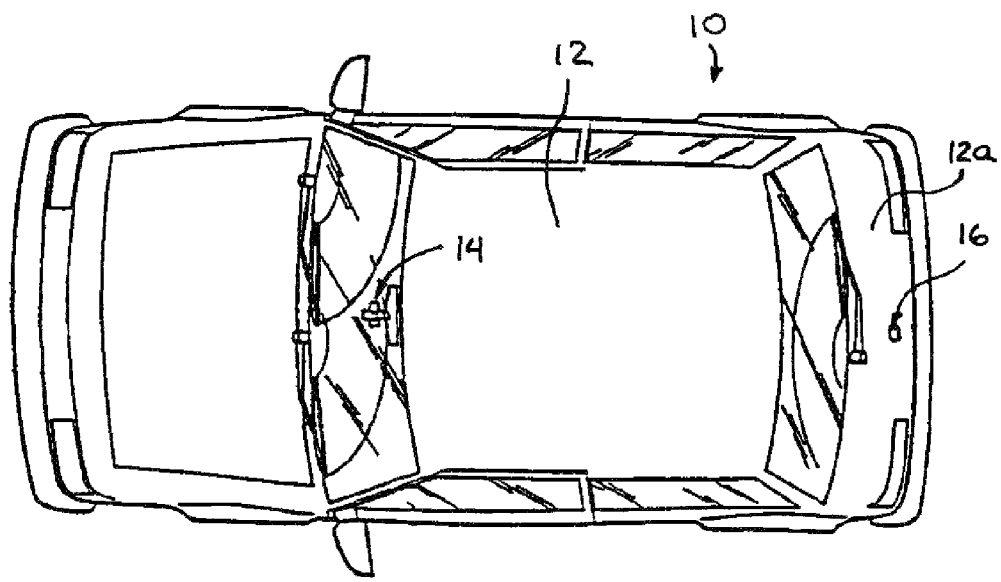
FIG. 2 is a plan view of the vehicle of FIG. 1.

Referring now to the drawings and the illustrative embodiments depicted therein, an image capture system or vision system or imaging and display system 10 is positioned at an exterior portion 12a of a vehicle 12, such as at a rearward portion 12a of the vehicle 12, and is operable to capture an image of a scene occurring exteriorly of the vehicle, such as rearwardly of the vehicle, and to display the image at a display device or display system 14 of the vehicle which is viewable by a driver of the vehicle (FIGS. 1 and 2). Vision system 10 includes display device or system 14 and an imaging system or imaging device 16, which includes an imager or image capture device or camera 22 that is directed exteriorly of the vehicle and has an exterior field of view 17 which preferably at least partially encompasses a "blind spot" area exteriorly of the vehicle. The images or frames captured by imaging system 16 are displayed at a display element 28 of display system 14 to assist the driver in viewing the blind spot areas. The display system 14 includes one or more user inputs 18 (FIG. 4) that are actuatable by a user of the system to control or adjust a function of the imaging system 16, which is remote from the display system 14. The vision system 10 is operable to communicate imaging signals from the imaging device or system to the display device or system and control signals from the display device or system to the imaging device or system along common connections or wiring.

Imaging system or imaging device 16 may be positioned at the exterior portion of the vehicle and directed generally exteriorly of the vehicle for capturing images of the exterior scene to assist the driver in maneuvering or driving the vehicle. Vision system 10 and/or imaging system 16 may utilize principles of other vehicle vision or imaging systems, such as a vision or imaging system of the types disclosed in U.S. Pat. Nos. 6,757,109; 6,717,610; 6,396,397; 6,201,642; 5,550,677; 5,670,935; 5,877,897; 5,796,094; 6,097,023; and 6,498,620, and U.S. patent application Ser. No. 09/441,341, filed Nov. 16, 1999, now U.S. Pat. No. 7,339,149; and/or U.S. provisional application Ser. No. 60/614,644, filed Sep. 30, 2004 by Camilleri et al. for CAMERA DISPLAY SYSTEM; and Ser. No. 60/618,686, filed Oct. 14, 2004 by Laubinger for VEHICLE IMAGING SYSTEM, which are hereby incorporated herein by reference. In the illustrated embodiment, the vision system is operable to capture and display images of the rearward area immediately behind the vehicle, so as to assist the driver in backing up or otherwise driving or maneuvering the vehicle rearwardly. However, the vision system may be operable to capture and display images of other areas exteriorly of the vehicle to provide images of other blind spot areas around or near the vehicle, without affecting the scope of the present invention. The vision system thus may be operable to captures images of the scene immediately rearward of the vehicle to assist the driver of the vehicle in backing up or maneuvering the vehicle in reverse. The back up assist system may be operable in response to the reverse gear of the vehicle being selected.

Preferably, the display element or display device may be located at an upper windshield area of the vehicle so as to be readily viewable by the driver of the vehicle. The display element may be located at or near the interior rearview mirror assembly of the vehicle or may be associated with the interior rearview mirror assembly of the vehicle. Optionally, the display element may be located at or near an accessory module or pod or windshield electronics module of the vehicle or may be associated with the accessory module or pod or windshield electronics module of the vehicle.

The imaging system may process the captured image data to detect objects or the like in the exterior scene. Such data processing may utilize aspects of the image processing techniques described in U.S. Pat. Nos. 6,353,392 and 6,313,454; and/or U.S. patent application Ser. No. 10/427,051, filed Apr. 30, 2003, now U.S. Pat. No. 7,038,577; and/or U.S. provisional application Ser. No. 60/638,687, filed Dec. 23, 2004 by Higgins-Luthman for OBJECT DETECTION SYSTEM FOR VEHICLE, which are hereby incorporated herein by reference. The display device or element may display the image of the scene or may display the detected objects and/or may display graphic overlays or the like (such as distance measurements, icons, text or the like) to enhance the display for viewing by the driver or occupant of the vehicle. The vision system may be selectively operable to provide different functions or modes or features as selected by the user via one or more user inputs, as discussed below.

The imaging, system 16 of vision system 10 thus may be operable in two or more modes and/or may provide various functions or features that are selectable by a user of the system (such as the driver of the vehicle) via one or more user inputs at or near or associated with the display system. For example, the imaging system may be selectively operable in a color mode or a black and white mode or a daytime or nighttime mode, or may be selectively operable to zoom in on a detected object or to pan across a scene or to adjust the gain, exposure and/or white balance in the captured images, in response to actuation of a respective user input by a user within the vehicle. Optionally, the imaging system may be selectively operable to process the images and display the images of the exterior scene in an outline form, where only the outlines of detected objects are shown at the display element, such as in a black and white line format. The image thus may be manipulated to provide an outline form and thus may be suitable for display on a low cost display element, such as a dot matrix display or the like, such as the type described in U.S. patent application Ser. No. 10/418,486, filed Apr. 18, 2003, now U.S. Pat. No. 7,005,974, which is hereby incorporated herein by reference. Also, or otherwise, the vision system may provide user inputs that enable a user to selectively actuate an overlay image to overlay images, such as distance measurements, text, icons, an image representation of the back of the vehicle, or other overlay images or icons, onto or over the image of the exterior scene, in order to enhance the display of the exterior scene for the user.

Figure 3:
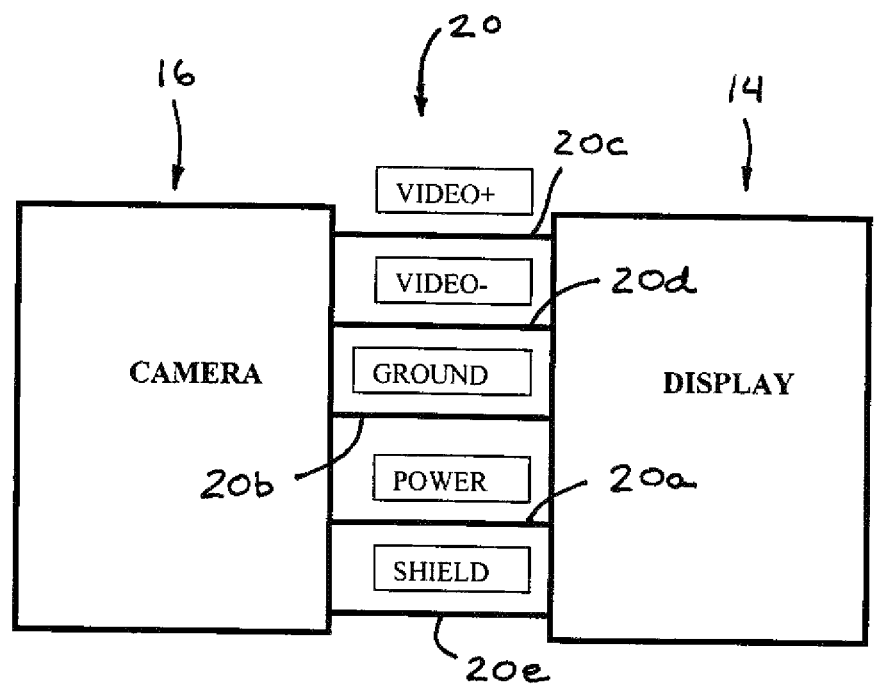
FIG. 3 is a block diagram of a camera and display device, showing the connections or wiring typically used to connect the camera to the display device.

As shown in FIG. 3, and as is typical for various known imaging devices and vision systems, there are five connections or wires or leads or communication links 20 between the display system 14 and the imaging system 16. The connections or links include a camera power connection 20a, a ground connection 20b, a video + connection 20c, a video return connection 20d and a shield 20e. In known reverse aid systems, providing a control of the camera, such as to activate a digital zoom or pan mode for the camera (or to otherwise control or adjust a camera setting or mode), from the display area (and a user input at or near or associated with the display device) requires additional wiring for the secondary communication or communications between the user input of the display device and the camera and, thus, is a costly option, for the automotive market and makes retrofitting a reverse aid system on a vehicle very difficult and costly. Controlling or adjusting or actuating these camera functions or modes or settings from the display area within the vehicle increases the overall system level performance and adds additional functionality to the system.

Figure 4:
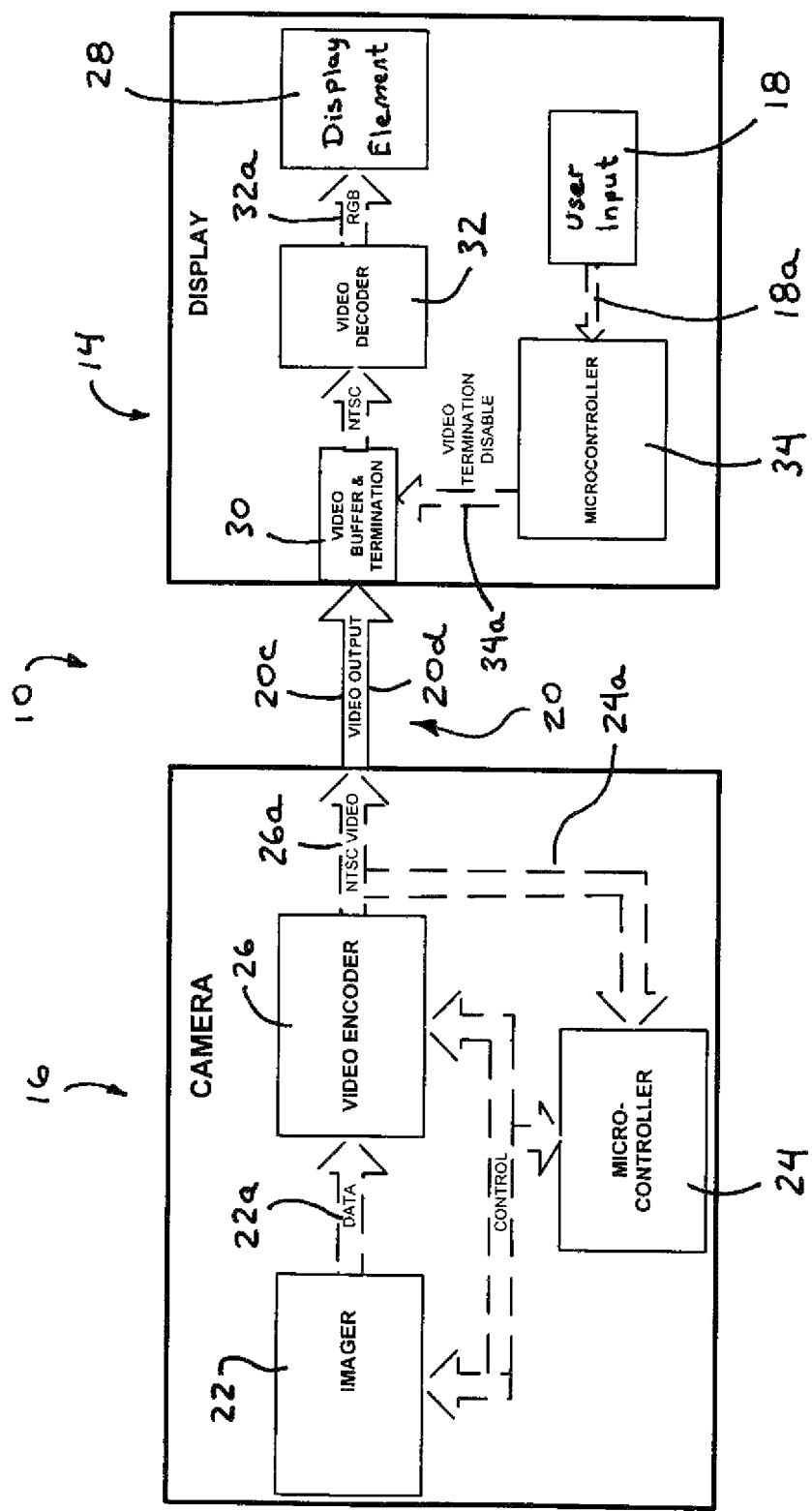
FIG. 4 is a block diagram of an imaging and display system in accordance with the present invention.

As shown in FIGS. 3 and 4, vision system 10 includes the communication links 20 (only the video + connection 20c and the video return connection 20d are separately shown in FIG. 4 for purposes of clarity) between the imaging system 16 and display system 14. As shown in FIG. 4, the imaging system 16 of vision system 10 includes an imaging sensor or imager 22, a camera microcontroller 24 and a video encoder 26. The imager or imaging array sensor 22 captures image data indicative of the exterior scene and generates a data signal 22a and outputs the data signal to the video encoder 26, which encodes the data and communicates an encoded video signal 26a to the display system 14 via the video + and video return connections 20c, 20d. Under normal operation, the camera typically outputs an NTSC video signal on the video + and video − or return connections 20c, 20d to the display system 14. This is typically done at about a 30 hertz frame rate. The camera microcontroller 24 controls the imager 22 and the video encoder 26, and monitors (as shown via monitoring link 24a in FIG. 4) the encoded video signal 26a from the encoder 26 to the display system 14. When a change in the signal 26a is detected by the camera microcontroller, the camera microcontroller 24 may adjust or control the imager 22 and/or video encoder 26 to set the imaging device or system to a different mode or function, as discussed below.

Display system or display device 14 includes a display element 28 and a display microcontroller 34. The display system 14 receives the encoded video signal 26a from the imaging system 16 via the video + and video return connections 20c, 20d, and displays the captured image on the display element 28, such as an LCD panel or the like (or other types of displays or display elements as discussed below). As shown in FIG. 4, display system 14 includes a video buffer and termination 30, a video decoder 32 and the display element 28. The video buffer and termination 30 receives the video signal 26a and passes the signal to the video decoder 32, which decodes the encoded video signal and communicates an image signal or RGB signal 32a to the display element 28. The display element 28 displays the captured image within the vehicle where it is readily viewable by a driver or occupant of the vehicle.

Display system 14 also includes display microcontroller 34 that is operable to receive a user input signal 18a from one or more user inputs 18 and to adjust or control the display element 28 and/or to enable or disable the video termination 30 in response to the user input signal 18a. When the video termination is disabled, the camera microcontroller 24 detects the change in the signal along the video + and video return connections 20c, 20d, and may adjust or control the imager 22 and/or video encoder 26 in response to such detection.

During normal operation of the imaging system, the imaging system 16 may output the NTSC video signal (or any other video signal protocol whether analog or digital) on the video + and video − or return connections to the display system 14. The camera microcontroller 24 may continuously or substantially continuously monitor the NTSC video output signal 26a for a normal output that is about one volt peak into a 75 ohm load (provided at the video buffer and termination 30). When an appropriate user input [such as a button or switch or the like at or near or associated with the display element or a voice command or a consequent of a user action (such as selection of a reverse gear of the vehicle or the like) or a vehicle action or condition or characteristic or status (such as in response to the vehicle reaching a particular or threshold forward or reverse vehicle speed or the vehicle encountering a braking condition or the like) or, other input or condition or characteristic or status or the like] is activated by a user action (such as a user input for selectively adjusting a camera function or mode, such as a digital zoom function or pan function or and adjustment of a gain or exposure or white balance function or a selection of a color mode or a black and white, mode or a night vision mode or the like), the display microcontroller 34 disables the video termination 30 at the display system 14 via a signal 34a. The disabling of the video termination 30 at the display system 14 causes the video encoder 26 of the imaging system 16 to stop outputting the NTSC video signal 26a. The camera microcontroller 24 senses the change in the output signal or voltage along the connections 20c, 20d, and may control or adjust the imager to a different or new camera setting in response to such a detected change in signal output/voltage, or may control or adjust the video encoder if appropriate in response to such a detected change in the video signal along the connections 20c, 20d.

Optionally, when multiple functions or modes are desired, the display microcontroller 34 may disable the video termination and apply a particular voltage across the connections 20e, 20d (via signal 34a) that corresponds to the particular, function or adjustment selected by the user at the user inputs, and the camera microcontroller 24 may be operable to determine the voltage applied on the connections and to adjust or control the imager and/or encoder accordingly. The camera microcontroller 24 may be preset or programmed to recognize the particular voltage across the connections and to control or adjust or activate the respective function or feature or mode in response to such detection and recognition. The camera adjustments or settings (such as activation of a digital zoom feature, a panning feature, a gain or exposure or white balance function or a black and white mode or night vision mode or the like) thus may be predetermined and based on the DC voltage level applied across the connections 20c, 20d by the display microcontroller 34 and sensed across the connections 20c, 20d by the camera microcontroller 24.

After the camera adjustment is made by the camera microcontroller, the display microcontroller may enable the video termination and remove the applied DC voltage if applicable, so that the encoder 26 will again communicate the video signal 26a to the display system 14. Optionally, the display microcontroller 34 may wait a predetermined amount of time before enabling the video termination again and removing the DC voltage level. This delay allows the camera microcontroller enough time to sense that the termination has been removed, that the new programmed settings have been uploaded to the imager, and that the settings have taken affect. Once the delay is completed, the video termination is enabled at the display, and the camera microcontroller and video encoder resume the NTSC signal to the display system to communicate the capture image data to the display system.

This process may be repeated for invoking and removal of special camera modes or functions. For example, for different user inputs and associated functions, the display microcontroller may disable the video termination and may apply a different voltage to the connections 20c, 20d. The camera microcontroller may then determine the voltage in the connections 20c, 20d and may adjust the imager and/or video encoder appropriately and in response to the detected voltage. The number of special modes of operation or functions that are desired to control or activate/deactivate at the display will dictate the number of voltages that are to be resolved by the camera microcontroller at the camera in order to activate or control or adjust the multiple camera settings from the display inputs. For example, if four different functions or modes and associated user inputs were desired, the display microcontroller may apply different voltages, such as at ¼ volt increments or the like, for the different inputs and functions, and the camera microcontroller may be operable to discern or resolve the different voltages and control or adjust the imager and/or video decoder according to the detected voltage.

The vision system of the present invention thus provides user selectable control or adjustment of an exterior facing camera via user inputs at an interior display of the vehicle, without requiring additional wiring for the connection between the inputs and the camera. The present invention thus is highly suitable for retrofitting imaging and display systems or vision systems and/or selecting an appropriate or desired camera and/or display device or system that provides the desired features without concerns as to the wiring or connections between the camera and imaging system and the display element and display system. A user may select an optional camera that has desired features and may install the camera at the vehicle and connect to the existing wiring, which may be the base wiring for a base camera that may not have the features of the new camera. The present invention thus provides for upgrading of a camera and/or display and/or vision system either as an option installed at the vehicle assembly plant, or as an aftermarket device, without the cost and difficulties associated with rewiring or wiring new connectors or links between a user input or inputs and the camera. Different optional, cameras and display systems and imaging systems thus be selected by an owner of a vehicle and may be readily installed in the vehicle without having to re-wire the vehicle or provide complicated communication links between the camera and the display device or system. The present invention thus allows for selection of a camera and display device or system having the desired features or content, without the costs and difficulties of implementing the high content cameras, since any selected camera and display device or system may utilize the same connections or communication links.

Optionally, the vision system may include or may be associated with an ultrasonic or radar device that determines the distance from the rear of the vehicle to a detected object. Optionally, other means for determining the distance to a detected object may be implemented, such as the means described in U.S. patent application Ser. No. 10/427,051, filed Apr. 30, 2003, now U.S. Pat. No. 7,038,577; and/or Ser. No. 11/105,757, filed Apr. 14, 2005, now U.S. Pat. No. 7,526,103; and/or U.S. provisional application Ser. No. 60/607,963, filed Sep. 8, 2004 by Schofield for IMAGING SYSTEM FOR VEHICLE, which are hereby incorporated herein by reference. The vision system may detect the distance to objects in various, zones or regions behind the vehicle and may provide a graphic or video overlay of the displayed image to, indicate to the driver the distance to one or more detected objects. The overlay may be enhanced, such as by flashing or the like, to enhance the viewability of the overlay, such as when a hazardous condition is encountered, such as when the vehicle is within a threshold distance to a detected object rearward of the vehicle and in the vehicle's path of travel. The graphic overlay may be initiated or activated in response to the vehicle being shifted into the reverse gear or may be selectively activated via a user input or the like, without affecting the scope of the present invention.

Optionally, the imaging system and/or camera and/or display system may be operable in conjunction with or in combination with a distance sensing/measuring/determining system, such as an ultrasonic sensing system or the like. For example, and with reference to FIG. 5, an imaging and display system or vision system 10' may include an imaging sensor or camera or imaging system 16', which may be generally centrally positioned at the rear portion of the vehicle 12', and one or more secondary or auxiliary sensing devices, such as ultrasonic sensors 36, which may be also positioned at the rear portion of the vehicle. In the illustrated embodiment, an ultrasonic sensor 36 may be positioned at or near each rear corner region 12b' of the vehicle 12'. Typically, an imaging sensor or camera may provide a wide angle field of view (shown generally at 38 in FIG. 5) rearward of the vehicle that is approximately a 120 degree field of view. Such a field of view may not fully encompass the regions immediately rearward of the vehicle and at or toward the side corners of the vehicle, whereby blind spots may still exist in those regions. In order to provide enhanced object detection of objects that may be positioned at those regions, such as when the vehicle is backing up, the ultrasonic sensors 36 may be operable to sense or detect objects in those regions. The imaging and display system may then display an indication at the display device or display system 14' of a detected object in response to such detection by the ultrasonic sensors. For example, the display may provide an iconistic display of the object superimposed upon the video image of the rearward scene as captured by the rearward facing camera, or may provide a flashing of the display at the image on the screen and in the region or regions of the detected object, and/or may provide a graphical overlay at the regions of the display that represent the detected object to indicate that an object has been detected in one of the rear corner regions or elsewhere rearward of the vehicle.

Figure 5:
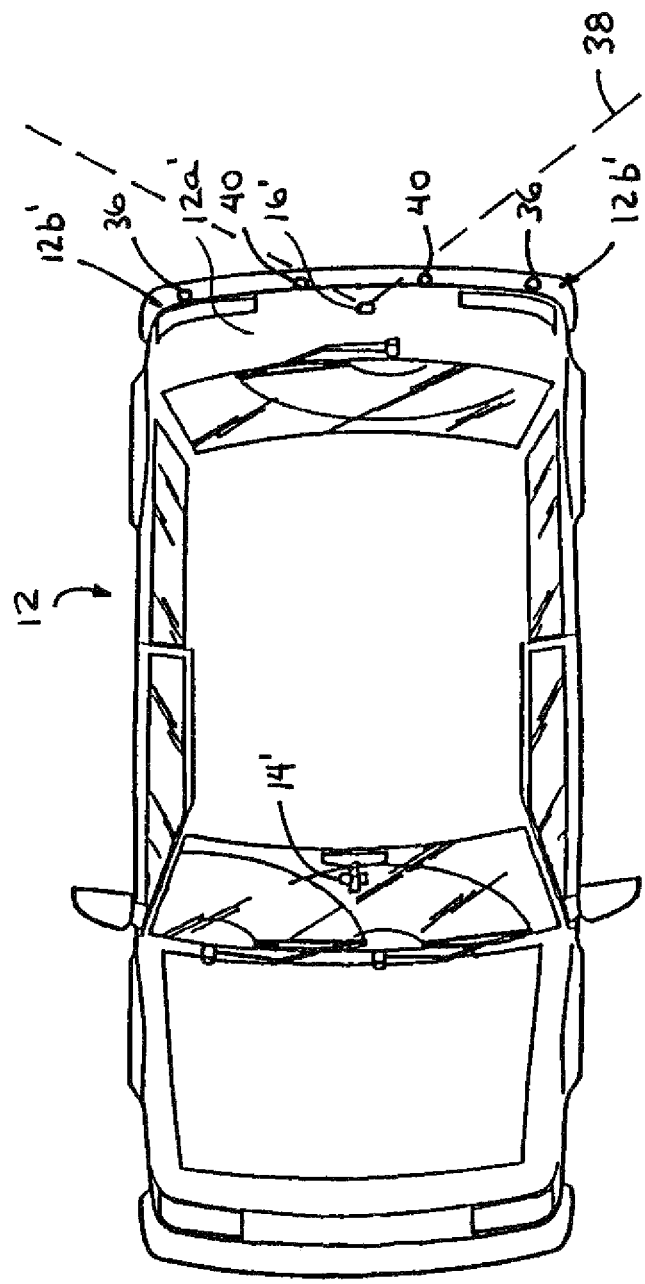
FIG. 5 is a plan view of a vehicle incorporating an imaging system in accordance with the present invention.

Optionally, an ultrasonic sensing system may include a plurality of sensors, such as three or more ultrasonic sensors, positioned and spaced across a rear portion of the vehicle, such as along a rear fender of the vehicle, or along a rear lift gate of the vehicle, or along a rear spoiler of the vehicle, or along a light bar associated with the license plate of the vehicle or the like. For example, and as shown in FIG. 5, the sensors may include two side or corner sensors 36 and one or more sensors 40 (such as two sensors 40 in FIG. 5) interspaced across the rear portion of the vehicle and between the corner sensors 36. Preferably, a light bar is provided at the license plate of the vehicle and includes the imaging sensor or camera, the ultrasonic sensors, and preferably a light for illuminating the license plate of the vehicle, such that the imaging sensor and ultrasonic sensors may be provided as a module at the rear of the vehicle.

The ultrasonic sensors 36, 40 may provide adjacent and overlapping sensing regions to provide a sensing range that encompasses substantially the entire region behind the vehicle and about eight feet or thereabouts rearward of the vehicle. The imaging sensor or camera 16' may capture images of the rearward exterior scene that is encompassed by the field of view of the camera, and the display may display images of the scene for viewing by the driver of the vehicle when the vehicle is backing up. The display may be adjusted or modified or enhanced in one or more of the regions associated with one or more of the ultrasonic sensors in response to a detection of an object by one or more of the ultrasonic sensors.

For example, the display may be divided into four zones, each zone of the display corresponding to a zone or region covered by a respective ultrasonic sensor. If that ultrasonic sensor detects an object, then the corresponding zone of the display may be adjusted or enhanced to indicate to the driver of the vehicle that an object is detected in a particular zone or region rearward of the vehicle. For example, one or more of the zones in the display may flash or modulate or may change intensity to indicate that an object has been detected in the region or zone rearward of the vehicle that corresponds to the enhanced or flashing or modulating display zone. Optionally, the display may provide a graphic overlay, such as a measurement bar or the like, to show a distance to a detected object.

Optionally, the ultrasonic sensor or auxiliary sensing device may provide a triggering or initial sensing function, and the imaging system may adjust a camera setting or characteristic in response to a detection of an object by one or more of the ultrasonic sensors. For example, the camera may be controlled or adjusted to electronically zoom to the appropriate zone or region of the captured image in response to a detection of an object by a respective ultrasonic sensor. Because the captured image may have distortion due to the wide angle lens or optic of the imaging system and camera, it may be desirable to adjust the imaging sensor or camera to provide enhanced imaging of an object detected in the field of view. The camera thus may be zoomed in on the appropriate zone or region to provide enhanced imaging of that zone or region and to provide reduced distortion of that zone or region and, thus, enhanced imaging and reduced distortion of the detected object when it is displayed on the display. The imaging and display system may optionally provide a dynamic overlay at the display to highlight the detected object in the display, and may display the distance (which may be detected or determined in response to the ultrasonic sensing devices) to the object.

Optionally, the imaging system may process particular zones or regions of the image data corresponding to the exterior scene more than other zones or regions, such as by utilizing aspects of the object detection, system described in U.S. patent application Ser. No. 10/427,051, filed Apr. 30, 2003, now U.S. Pat. No. 7,038,577; and/or Ser. No. 11/105, 757, filed. Apr. 14, 2005, now U.S. Pat. No. 7,526,103; and/or U.S. provisional application Ser. No. 60/607,963, filed Sep. 8, 2004 by Schofield for IMAGING SYSTEM FOR VEHICLE, which are hereby incorporated herein by reference. Optionally, the imaging system may process particular zones or, regions in response, to a detection of an object by one or more of the ultrasonic sensors. For example, if one of the ultrasonic sensors initially detects an object at the left rear corner of the vehicle, the control may process the image data that corresponds to that area or region, or may enhance the processing of the image data that corresponds to that area or region, in order to identify or classify or detect the detected object in that area or region. The imaging and display system may then highlight or enhance the display at the detected object, such as by a graphic overlay at the display or an adjustment or modulation of the display in the region of the detected object. The ultrasonic sensors thus may function to detect an object and to direct the image processor to process the image data that corresponds to the area in which the object was detected. The image processor thus may process the image data for the regions that may have an object therein, and may provide reduced processing of other regions, and thus may provide efficient and enhanced processing of the captured images.

Optionally, the display may be actuated in response to a detection of an object behind the vehicle when the vehicle is backing up or in reverse. For example, when a driver shifts the vehicle into reverse, the ultrasonic sensors at the rear portion of the vehicle may be activated to sense the area rearward of the vehicle. The imaging and display system may monitor the ultrasonic sensors or may receive an input from the ultrasonic sensors or system, and may initially be in a non-active or non-display mode, where the display is deactivated. When an object rearward of the vehicle is detected by the ultrasonic sensors, the detection by the ultrasonic sensor or sensors may trigger the imaging and display system to be activated or set to an active mode, whereby the imaging sensor may begin capturing images of the rearward scene and the display may begin displaying images of the rearward scene (which may include enhanced imaging or processing or display or highlighting of the detected object such as discussed above). The activation of the display may provide an alert function to the driver of the vehicle that an object is detected behind the vehicle and/or in the path of the vehicle, so as to draw the driver's attention to the activated display and to the object being displayed in the display.

Optionally, the imaging and display system and ultrasonic sensing system may be implemented in conjunction with a movable video display, such as a slide out or extendable/retractable display screen that extends and retracts from the interior rearview mirror assembly or from an accessory module or overhead console or the like within the vehicle cabin and in the field of view of the driver of the vehicle. For example, the video display may comprise a slide out video display such as, described in PCT. Application No. PCT/US03/40611, filed Dec. 19, 2003 and published on Jul. 15, 2004 as International Publication No. WO 2004/058540; and/or U.S. provisional application Ser. No. 60/630,061, filed Nov. 22, 2004 by Lynam et al. for MIRROR ASSEMBLY WITH VIDEO DISPLAY; Ser. No. 60/667,048, filed Mar. 31, 2005 by Lynam at al. for MIRROR ASSEMBLY WITH VIDEO DISPLAY, which are hereby incorporated herein by reference. The display screen thus may be automatically extended and activated in response to a detection of an object rearward of the vehicle by the ultrasonic sensors, whereby the extension of the display screen provides an alert to the driver so that the driver's attention is readily drawn to the now extended and activated display screen. The imaging and display system and ultrasonic sensing system of the present invention thus may provide a display only when there is an object detected and may provide an alert function to the driver to view the display when an object is detected. In such an application, the video display may not be extended and be activated in response to the shifting into reverse, but would extend and activate after detection of an object exteriorly or rearward of the vehicle by the auxiliary sensor or sensors.

Although described above as ultrasonic sensors or sensing devices, it is envisioned that the imaging and display system of the present invention may be combined with other types of sensing systems or auxiliary or secondary or triggering or initial sensing devices or sensing techniques. For example, the imaging and display system may be operable in conjunction with or in combination with radar devices, sonar devices, laser sensing or lidar devices or laser scanning devices or the like, without affecting the scope of the present invention. The initial or triggering or auxiliary sensing device or devices may initiate or trigger enhanced imaging or zooming or other characteristics of the camera, or may initiate or trigger enhanced processing of the captured images, or may initiate or trigger enhanced display features or the like, in response to a detection of an object rearward of the vehicle by one of the initial or triggering or auxiliary sensing devices. Although shown and described as being combined with or operating in conjunction with a rearward facing camera and associated display, it is envisioned that aspects of the auxiliary sensing devices or system of the present invention may be equally suitable for use in conjunction with sideward facing imaging systems, such as side object detection systems or lane change assist systems or the like, or forward facing imaging systems, such as lane departure warning systems, adaptive speed control, headlamp controls, rain sensors or the like.

Optionally, and desirably, the image capture device or imaging device may be at least partially contained within an imaging module or camera module, which includes imaging sensor or imager and a lens positioned within a housing which defines a transparent window (which may comprise an at least substantially transparent glass or polycarbonate or acrylic (or other suitable material) window or panel) at the end of lens (such as described in PCT Application No. PCT/US2003/036177, filed Nov. 14, 2003 and published Jun. 3, 2004 as International Publication No. WO 2004/047421, which is hereby incorporated herein by reference). The imaging module may include the circuitry and controls or camera microcontroller and video encoder for the imaging sensor, such as on one or more printed circuit boards contained within the housing.

Optionally, the camera module may comprise a fully sealed module, which protects the imaging device and microcontroller and circuitry from exposure to the elements at the exterior of the vehicle, such as dust, dirt, mud, water, ice, salt and the like. The lens may provide part of the sealing of the module. For example, the camera module may include a lens that may be purchased or obtained as a subassembly that is separate from the imaging sensor and mounted to the module. The lens may loaded into the module, such as via insertion of the lens or threading of the lens into an aperture or opening in the module wall or adjacent to a transparent cap or cover of the module wall. The lens assembly (which is typically a five element lens set, but may include more or less optic elements without affecting the scope of the present invention) may be positioned at the opening or aperture or cover such that the lens is positioned at the appropriate or precise location relative to the imaging sensor or chip to properly focus the image onto the imaging sensor.

Optionally, the lens may be adjustably positioned, such as via threading into a threaded opening, to precisely position the lens to focus the image onto the imaging sensor. Once positioned at the precise or appropriate location, the lens may be retained or secured in the precise position, and the module may then be sealed with a back plate and gasket to seal the lens and imaging sensor and associated microprocessor and circuitry within the module. The module thus provides enhanced positioning of the lens relative to the imaging sensor, since the lens may be readily adjusted to provide proper focusing relative to a fixed imaging sensor.

The module may include a transparent cap or cover through which the field of view of the imaging sensor and lens is directed. The transparent cap may comprise a molded polycarbonate material or the like and may provide a substantially transparent and durable cover at the lens. Optionally, the transparent cap may include an anti-reflective coating or a hydrophobic or hydrophilic coating or the like, such as the coatings described in PCT Application No. PCT/US2003/036177, filed Nov. 14, 2003 and published Jun. 3, 2004 as International Publication No. WO 2004/047421, which is hereby incorporated herein by reference. The transparent cap thus may provide functionality and sealing to the camera module.

Because the lens assembly may be selected and positioned at the imaging sensor as a separate sub-assembly or as an aftermarket sub-assembly, the lens assembly may be selected to provide the desired effect depending on the particular application of the camera module. The lens may then be assembled to the module and the appropriate module, with the desired lens and features or content, may be mounted to the vehicle and connected to the existing connector (such as a five wire connector as described above). The display system may further process the image data or encoded signal to digitally correct for distortion in the image due to lens distortion and the like.

The present invention thus provides a customized imaging system that provides various features or functions or modes or content to the imaging device or system without requiring costly communication or data wires connecting between the imaging device and the user inputs within the vehicle. The present invention thus provides an vision system that is suitable for economically configuring the system to the desired content for a particular application of the imaging system. A user thus may select a vision system with a particular camera and/or display, with little or no affect on the wiring or connections between the camera and the display.

Optionally, the imaging system may be operable to function as a lane departure warning (LDW) system utilizing image processing of the images captured by the rearward facing imaging sensor or camera. The imaging system may include controls and/or circuitry for operating as such a lane departure warning system and thus may process the images to detect the lane markers and the like along the road surface, or the imaging system may provide image data to a separate image processor or microcontroller for processing the image data to detect the lane markers and the like along the road surface. The imaging system may utilize image processing techniques such as those described in U.S. patent application Ser. No. 10/427,051, filed Apr. 30, 2003, now U.S. Pat. No. 7,038,577; and/or Ser. No. 11/105,757, filed Apr. 14, 2005, now U.S. Pat. No. 7,526,103; and/or U.S. provisional application Ser. No. 60/607,963, filed Sep. 8, 2004 by Schofield for IMAGING SYSTEM FOR VEHICLE; and/or Ser. No. 60/638,687, filed Dec. 23, 2004 by Higgins-Luthman for OBJECT DETECTION SYSTEM FOR VEHICLE, which are hereby incorporated herein by reference.

The imager or imaging sensor 22 of the imaging system 16 of the imaging system 10 may comprise an imaging array sensor or a pixelated imaging array, such as a multi-pixel array such as a CMOS sensor or a CCD sensor or the like, such as the types disclosed in commonly assigned U.S. Pat. Nos. 5,550,677; 5,670,935; 5,796,094; 5,877,897; 6,097,023; 6,498,620; and 6,690,268, and U.S. patent application Ser. No. 09/441,341, filed Nov. 16, 1999, now U.S. Pat. No. 7,339,149, which are hereby incorporated herein by reference, or such as an extended dynamic range camera, such as the types disclosed in PCT Application No. PCT/US2003/036177, filed Nov. 14, 2003 and published Jun. 3, 2004 as International Publication No, WO 2004/047421, which is hereby incorporated herein by reference. For example, the imaging sensor may comprise a CMOS camera, such as the OV7930 single chip CMOS color NTSC camera available from OmniVision Technologies Inc. of Sunnyvale, Calif. Such color cameras may have the performance characteristics identified above and may additionally provide RGB and/or YCrCb video signals. Preferably, the color video camera operates at a minimum illumination (3000 K) of less than about 5 lux at f1.2, more preferably of less than about 3 lux at f1.2, and most preferably less than about of less than about 2 lux at f1.2. Such CMOS imaging sensors typically may have a peak sensitivity in the near infrared range, such as at approximately 850 nm to 900 nm.

Such pixelated imaging sensors may include a plurality of pixels, with at least some of the pixels masked or covered with a particular color filter, such that the individual pixels function to capture a particular color, such as red, green and blue colors or the like, such as disclosed in U.S. Pat. Nos. 5,550,677; 5,670,935; 5,796,094; 6,097,023; and/or 6,498,620, referenced above. For example, the imaging sensor may comprise an individual blue or a green or a red color filter over each pixel element of the CMOS multi-pixel element array. The imaging sensor is thus operable to provide color images to the display. Such RGB filters enable the capture of a color image by the CMOS detector, but necessarily result in a reduced or decreased low light level sensitivity for a color camera compared to a monochromatic or black and white camera. Optionally, and preferably, the imaging sensor may be capable of selectively operating in either a color mode, in which a color image may be displayed at display element 28 of display system 14, or a monochromatic or black and white mode, in which a monochromatic or black and white image may be displayed at display element 28 of display system 14, such as by utilizing aspects of the imaging sensor disclosed in U.S. Pat. No. 6,498,620; and/or PCT Application No. PCT/US2003/036177, filed Nov. 14, 2003 and published Jun. 3, 2004 as International Publication No. WO 2004/047421, which are hereby incorporated herein by reference.

Although described as a CMOS type camera, clearly other types of imaging arrays or imaging sensors or cameras may be implemented with the imaging system of the present invention. For example, the imaging sensor may comprise a CCD or other type of sensor, without affecting the scope of the present invention. Preferably, the selected imaging sensor has a low dark current and thus provides enhanced ruggedness and enhanced performance at higher temperatures. Optionally, the dark current (the current through the pixels when they are not sensing light) may be used to detect the temperature at the imaging sensor, such as described in U.S. patent application Ser. No. 11/105,757, filed Apr. 14, 2005, now U.S. Pat. No. 7,526,103; and U.S. provisional application Ser. No. 60/607,963, filed Sep. 8, 2004 by Schofield for IMAGING SYSTEM FOR VEHICLE, which is hereby incorporated herein by reference.

Optionally, the imaging device or system may communicate the video signals to the display device or system via other types of signal communicating means. For example, the imaging device or system may communicate the video signals to the display device or system via an LVDS output of the imaging device or system. Optionally, the imaging system and the display system may share common components or circuitry or a common microprocessor to reduce components and cost of the vision system.

Figure 6:
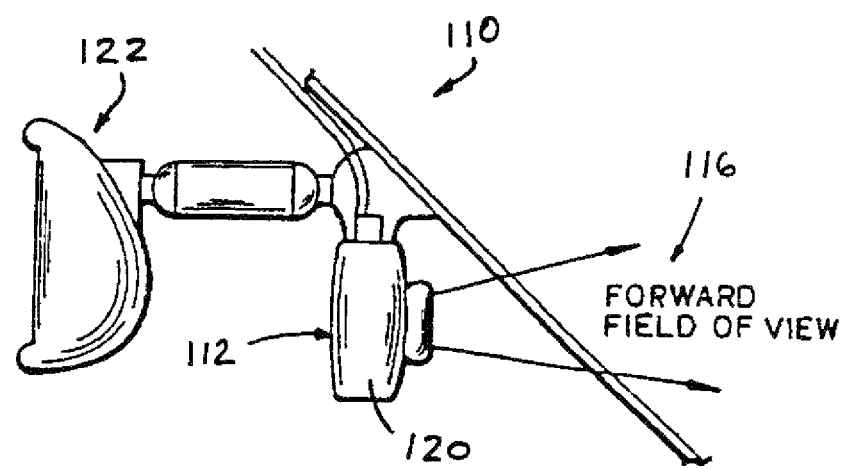
FIG. 6 is a side elevation of a portion of a vehicle embodying an imaging system in accordance with the present invention.

Referring now to FIG. 6, an image capture system or imaging system 110 is positioned at a vehicle, such as at or in an interior portion of the vehicle, such as at or in an accessory module or pod or attachment 112 of the vehicle, and is operable to capture an image of a scene occurring exteriorly of the vehicle, such as forwardly of the vehicle. Imaging system 110 includes an image capture device or imaging device or imaging system or camera or sensor 114 that is directed exteriorly of the vehicle and has an exterior field of view 116. The images or frames captured by image sensor 114 are processed by a control 118 to detect objects or items of interest in the captured images. The control may process the captured image data to determine if headlamps or taillights of other vehicles are present in the images, such as for a headlamp control system, and/or the control may process the captured images to detect lane markers along the road surface, such as for a lane departure warning system, and/or may process the image data to detect other characteristics or objects, as discussed below (such as by utilizing aspects of the imaging system described in U.S. provisional application Ser. No. 60/618,686, filed Oct. 14, 2004, which is hereby incorporated herein by reference in its entirety). The control may synchronize the processing techniques and the camera or image sensor settings to enhance and/or optimize processing of images for the particular system or function, as also discussed below.

Imaging sensor 112 may be positioned at the vehicle and directed or oriented with a field of view generally exteriorly of the vehicle for capturing images of the exterior scene for processing by the control, as discussed below. Imaging system 110 may utilize principles of other vehicle vision or imaging systems, such as a vision or imaging system or control of the types disclosed in U.S. Pat. Nos. 6,757,109; 6,717,610; 6,396,397; 6,201,642; 6,353,392; 6,313,454; 6,396,397; 5,550,677; 5,670,935; 5,796,094; 5,877,897; 6,097,023; and 6,498,620, and U.S. patent application Ser. No. 09/441,341, filed Nov. 16, 1999, now U.S. Pat. No. 7,339,149, and Ser. No. 10/427,051, filed Apr. 30, 2003, now U.S. Pat. No. 7,038,577, which are all hereby incorporated herein by reference. In a preferred embodiment, the imaging system 112 may include a lens element or optic between the imaging device 114 and the exterior scene. The optic may comprise an asymmetric optic, which focuses a generally central portion of the scene onto the imaging device, while providing classical distortion on the periphery of the scene or field of view.

In the illustrated embodiment, the image sensor 112 is mounted at or in an accessory module or windshield electronics module or mirror attachment or pod 120 and is arranged to have a field of view 116 forward of the vehicle, such as through the windshield of the vehicle and preferably through a portion of the windshield that is wiped by a windshield wiper of the vehicle. The image sensor 112 thus may capture images of a forward scene as the vehicle is traveling forwardly along a road or street or highway or the like. Optionally, the imaging device or sensor may be positioned elsewhere, such as at or in the interior rearview mirror assembly 122, or at or in an accessory module or windshield electronics module or the like (as discussed below), without affecting the scope of the present invention. Optionally, the image sensor and imaging system may be operable to capture images of other areas exteriorly of the vehicle to provide image data of other areas around or near the vehicle, without affecting the scope of the present invention. The imaging system thus may be operable to capture images of the scene sidewardly of the vehicle for a blind spot or side object detection or lane change assist systems or immediately rearward of the vehicle to detect objects rearward of the vehicle, such as for assisting the driver of the vehicle in backing up or maneuvering the vehicle in reverse.

Figure 7:
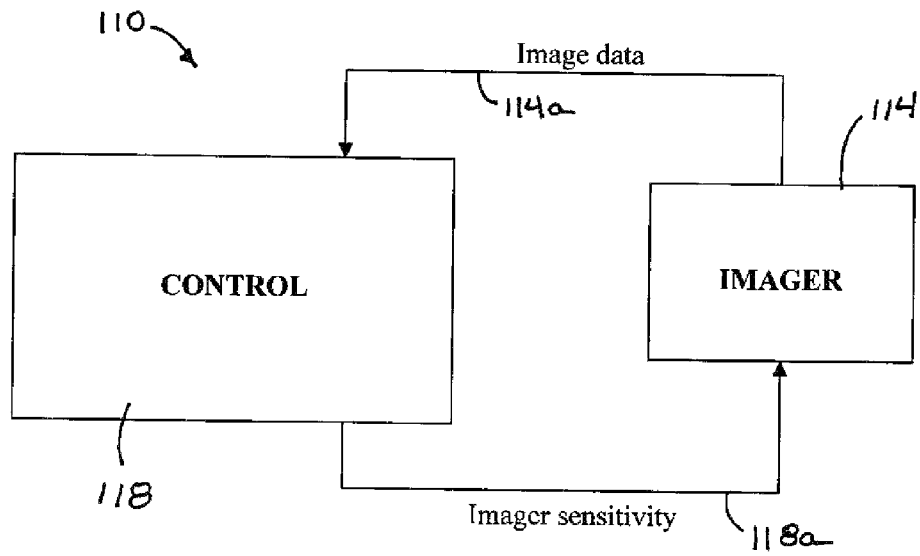
FIG. 7 is a block diagram of an imaging system having an imager and a control.

As shown in FIG. 7, control 118 may control the imager or image sensor 114 via a control signal 118a, while the control may receive image data from the image sensor via an image data signal 114a. The control or microprocessor 118 is operable to process the image data generated by the image sensor 114 to analyze the image data and detect objects or light sources of interest in the captured image. The control or imaging system may selectively process the captured image data to detect objects or light sources or lane markers or the like in the exterior scene, and may process particular portions or regions of the captured image in accordance with the respective function of the control, as discussed below.

The control may be operable to control various accessories (or to generate an output to a control or circuitry of one or more accessories) in response to the image processing. For example, the control may control or adjust a headlamp high-low beam setting in response to a detection of headlamps or taillights in the captured images, and/or may actuate an alert device, such as a visible display or audible alert or the like, in response to a detection of the vehicle drifting out of its lane along the road, and/or may adjust an interior lighting or display intensity of a light or display within the vehicle in response to an ambient light detection, and/or may generate other outputs or actuate/control other accessories in response to detections of other objects or light sources of interest via such image processing.

The imaging system thus may be operable to function as or in conjunction with a lane departure warning system, and may generate an alert to the driver of the vehicle in response to a detection that the vehicle is drifting or moving out of a detected lane along the road. Such an application may utilize principles of systems of the types described in U.S. Pat. Nos. 6,353,392 and 6,313,454; and/or U.S. patent application Ser. No. 10/427,051, filed Apr. 30, 2003, now U.S. Pat. No. 7,038,577; Ser. No. 11/105,757, filed Apr. 14, 2005, now U.S. Pat. No. 7,526,103; and/or Ser. No. 10/209,173, filed Jul. 31, 2002, now U.S. Pat. No. 6,882,287, and/or U.S. provisional application Ser. No. 60/607,963, filed Sep. 8, 2004 by Schofield for IMAGING SYSTEM FOR VEHICLE; and/or Ser. No. 60/638,687, filed Dec. 23, 2004 by Higgins-Luthman for OBJECT DETECTION SYSTEM FOR VEHICLE, which are hereby incorporated herein by reference. Optionally, the imaging system may capture and process images for a headlamp control application, and may utilize principles of systems of the types described in U.S. Pat. Nos. 6,824,281; 5,796,094; 6,097,023; 5,320,176; and 6,559,435, which are hereby incorporated herein by reference, and/or may capture and process images for a rain sensing function or rain sensor application, and may utilize principles of the systems of the types described in U.S. Pat. Nos. 6,824,281; 6,320,176; 6,353,392; 6,313,454; 6,516,664; 6,341,523; and 6,250,148; and/or in U.S. patent application Ser. No. 10/348,514, filed Jan. 21, 2003, now U.S. Pat. No. 6,968,736, which are all hereby incorporated herein by reference, and/or may, capture and process images for an ambient light detection or the like, and may utilize principles of systems of the types described in U.S. Pat. Nos. 5,550,677 and/or 5,670,935, which are hereby incorporated herein by reference, and/or may capture and process images for a collision avoidance system or vehicle separation system, and, may utilize principles of systems of the types described in U.S. Pat. Nos. 6,411,204; 6,396,397; 6,124,647; 6,291,906; and 6,534,884, and/or U.S. patent application Ser. No. 10/422,512, filed Apr. 24, 2003, now U.S. Pat. No. 7,123,168, which are all hereby incorporated herein by reference, and/or may capture and process images for a navigational system, and may, utilize principles of systems of the types described in U.S. Pat. Nos. 6,477,464; 5,924,212; 4,862,594; 4,937,945; 5,131,154; 5,255,442; 6,678,614; and/or 5,632,092, and/or U.S. patent application Ser. No. 10/456,599, filed Jun. 6, 2003, now U.S. Pat. No. 7,004,593; Ser. No. 10/645,762, filed Aug. 20, 2003, now U.S. Pat. No. 7,167,796; Ser. No. 11/105,757, filed Apr. 14, 2005, now U.S. Pat. No. 7,526,103; and Ser. No, 10/422,378, filed Apr. 24, 2003, now U.S. Pat. No. 6,946,978, now U.S. Pat. No. 6,946,978; and/or PCT Application No. PCT/US03/40611, filed Dec. 19, 2003 and published Jul. 15, 2004 as International Publication No. WO 2004/058540; and/or PCT Application No. PCT/US04/015424, filed May 18, 2004 and published Dec. 2, 2004 as International Publication No. WO 2004/103772, and/or U.S. provisional application Ser. No. 60/607,963, filed Sep. 8, 2004 by Schofield for IMAGING SYSTEM FOR VEHICLE, which are all hereby incorporated herein by reference. Other accessories or functions or applications may also or otherwise be provided or controlled or adjusted by the imaging system, without affecting the scope of the present invention.

The control may adjust one or more characteristics or settings of the image sensor or camera and/or may operate an iris and/or an optical zoom and/or a digital zoom or the like so that the image sensor is adapted or set to enhance image capturing for a particular function of the imaging system or control. Optionally, the control may adjust a focus of the image sensor (such as via adjustment of the lens or optic) to provide a clear captured image focused on the desired or appropriate objects for the particular application of the imaging system.

The imager or imaging sensor 114 of the imaging system 110 may comprise an imaging array sensor or a pixelated imaging array, such as a multi-pixel array such as a CMOS sensor or a CCD sensor or the like, such as the types disclosed in commonly assigned U.S. Pat. Nos. 5,550,677; 5,670,935; 5,796,094; 5,877,897; 6,097,023; 6,498,620; and 6,690,268, and U.S. patent application Ser. No. 09/441,341, filed Nov. 16, 1999, now U.S. Pat. No. 7,339,149, which are hereby incorporated herein by reference. For example, the multi-pixel array may comprise a multi-pixel array having a 640× 480 pixel array or the like. In order to reduce the computational load on the processor, only a desired subset or zone of the multi-pixel array frame may be chosen to be processed, such as for a particular application of the imaging system. For different applications, the objects or light sources of interest may be different objects or categories or classifications of objects and/or may be typically located at different regions of the captured image. For example, for a headlamp control application or function, the objects of interest are light sources, particularly headlamps and taillights, that are typically located at a generally central band or region of interest across the captured images, while for a lane departure warning application or function, the objects of interest are lane markers or road edges or the like that are typically located along a lower region of interest of the captured images (such as along the lower about 30 percent of the captured image or thereabouts). For ambient light detection, the light or region of interest would typically be along the upper region of the captured images (such as about the upper 20 percent of the captured image or thereabouts). The desired or appropriate or chosen subset or zone or target area of the multi-pixel array frame may be processed for the particular application to reduce processing or computational load when additional processing of other subsets or zones may not enhance the performance of the imaging system for that particular application.

Also, for different applications, it may be desirable to capture the respective images with the image sensor being at a different sensitivity or setting. For example, a camera setting or characteristic, such as an exposure time, an amplification, a gain, a white balance and/or the like, of the image sensor may be adjusted for capturing images to optimize the captured image and image data for a particular application or function. Amongst other things, the sensitivity of the image sensor can be adjusted by adjusting the integration time of the pixels and the amplification stage in reading out pixels. This allows the image sensor to be adapted to various lighting conditions at the observed exterior scene. In a closed loop camera control scheme, the image sensor sensitivity can be adjusted as determined by an application module so that the image brightness meets the application specific requirements. For example, the control may adjust the image sensor to be at an increased sensitivity for detecting headlamps and taillights during nighttime conditions, yet may decrease the sensitivity for detecting lane markers along the road surface, particularly during nighttime conditions when the headlamps are activated and the road is thus well illuminated. Other adjustments or settings or characteristics, such as a desired or selected zone of interest in a frame or an optical zoom or digital zoom or panning of or through a frame or the like, may be made or set or adjusted to optimize the image sensor for capturing one or more images for a particular function or accessory control.

The control thus may adjust a characteristic or setting of the imaging sensor for particular captured images and may process the image data of those particular captured images in a manner or processing technique suited for a particular application or function of the control, such as for headlamp control, lane departure warning, rain sensing, vehicle detection, vehicle lighting and/or display control, and/or the like. The control may synchronize the camera settings for particular captured images with the processing technique applied to the image data associated with those captured images, and may switch or alternate between different settings and processing techniques to provide the desired processing and analysis and output for the desired applications.

Figure 8:
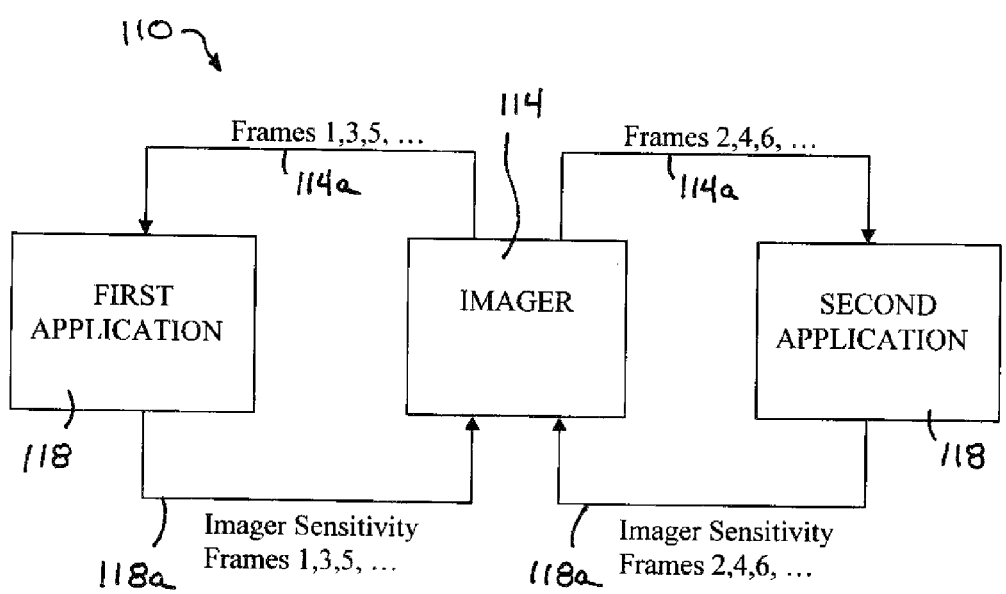
FIG. 8 is a block diagram of an imaging system in accordance with the present invention, showing different exemplary applications of the control.
Figure 9:
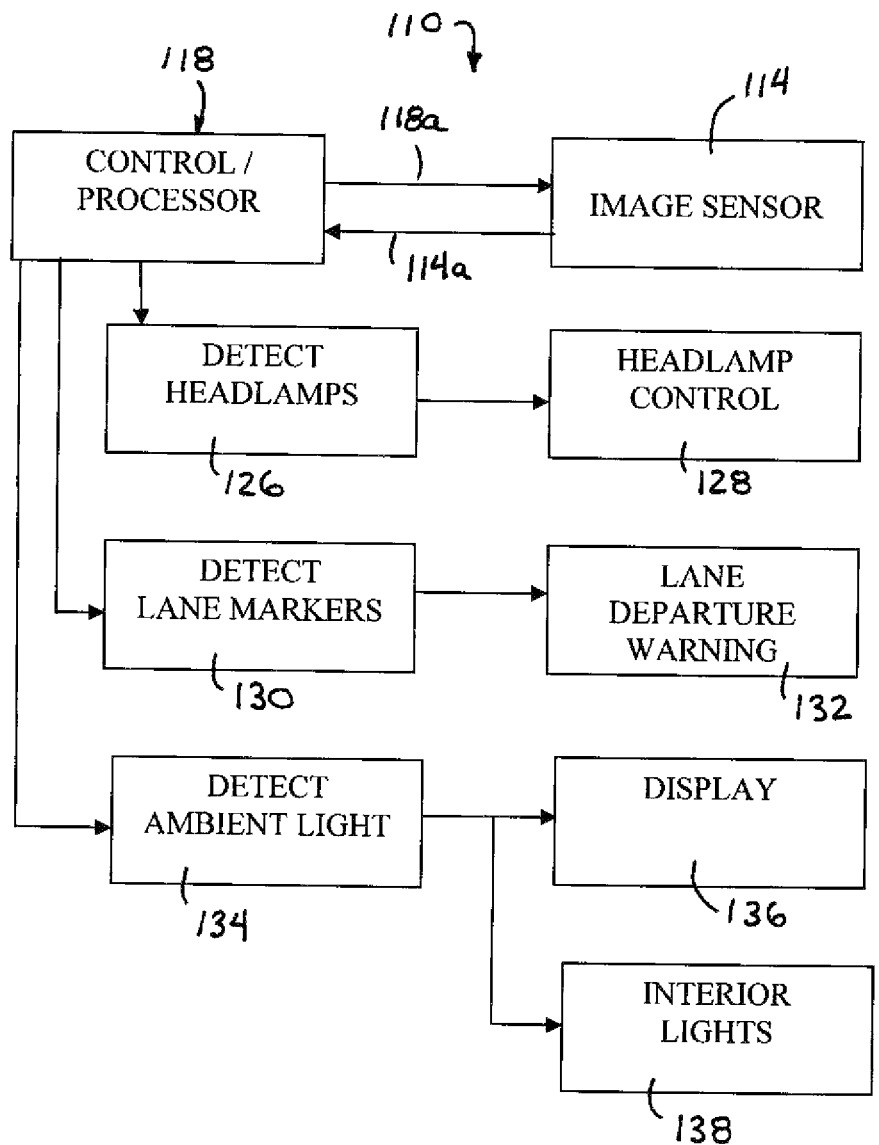
FIG. 9 is another block diagram of the imaging system of the present invention.

For example, and with reference to FIGS. 8 and 9, the control may selectively or occasionally or intermittently process images for first and second applications, such as a lane departure warning system and a headlamp control or the like. The control thus may adjust a camera setting or settings or sensitivity or other characteristic or parameter of the image sensor for capturing a first set of images and may process the image data from the first set of captured images in a first manner, and may generate a first output in response to the first image processing. The control may also adjust a camera setting or settings or sensitivity or other characteristic or parameter of the image sensor for capturing a second set of images and may process the image data from the second set of captured images in a second manner, and may generate a second output in response to the first image processing. The first and second camera settings/characteristics and/or the first and second processing manners or techniques may be different from one another to optimize the capturing and processing of the image data for the particular first or second application or function. The control may further adjust the camera settings and image processing techniques for a third application or more applications as desired, without affecting the scope of the present invention. The first and second (and third and more if applicable) settings and processing techniques are synchronized such that each image captured by the image sensor at one of the settings is processed by the control or processor at the appropriate or corresponding processing technique for the associated application or function or accessory control.

Multiple applications thus can be operated and controlled using the same imager and processing resources of the imaging system. In a case where only two applications share the system resources and where frames of image data are thus processed alternately by the two application modules using the same processor, the control may alternate every other image for the two applications. For example (and as shown in FIG. 9), images 1, 3, 5, etc. may be captured with the image sensor settings at a particular setting and may be processed according to a particular processing technique, while images 2, 4, 6, etc. may be captured with the image sensor settings at a different setting and/or may be processed according to a different processing technique. Clearly, however, other iterations and alternate capturing and/or processing of images may be implemented without affecting the scope of the present invention. Although shown as separate applications in FIG. 9, the same image processor may process the different sets of images for the respective first and second applications of the imaging system.

Optionally, such as for cases where the two applications do not have to process images at the same frame rate, the frame rate ratio can be adjusted accordingly. For example, if the imager is operable to provide up to 15 frames per second (fps), and the first application needs the control to process five frames per second while the second or other application only needs the control to process one frame per second, then the control may process five frames in a row for the first application, and may then process only one frame for the second application. This processing scheme may be adjusted for any desired frames per second and may be extended to allow more than two applications to, execute on the system, without affecting the scope of the present invention.

As shown in FIG. 8, the control or image processor 118 may selectively process the image data to detect a desired object or light source of interest. For example, the control 118 may process image data to detect headlamps (as shown at 126 in FIG. 8), and may generate an output to a headlamp control 128 to adjust or control the headlamps of the vehicle (or the control 118 may adjust or control the headlamps of the vehicle in response to the image processing). Optionally, the control 118 may also or otherwise selectively process the image data to detect lane markers (as shown at 130 in FIG. 8), and may generate an output to a lane departure warning system or to an alert device 132 to alert the driver of a lane drift or the like as the vehicle travels along the road. Optionally, the control 118 may also or otherwise selectively process the image data to determine an ambient light level, (as shown at 134 in FIG. 8), and may generate an output to a display 136 or to an interior light control 138 or the like to adjust an intensity of the display or lights in response to such image processing. Other captured images and/or other objects or light sources or light levels of interest may also or otherwise be analyzed to provide other outputs to or control of other functions or accessories of the vehicle, without affecting the scope of the present invention. Each of the image processing techniques applied to the image data may be synchronized with the settings or sensitivity of the image sensor to optimize the performance and detection capabilities of the imaging system for the particular applications associated with or conducted by the imaging system.

The present invention thus provides an imaging system that may selectively capture images via an image sensor and may selectively process the captured images to determine or detect a desired or appropriate characteristic of the captured images. The imaging system may synchronize a setting or sensitivity or focus of the image sensor with an image processing technique so that the captured image data are selectively captured and/or processed in a particular manner for a particular application of the imaging system. The imaging system thus may provide multiple functions or applications by utilizing a common imaging sensor and common image, processor, and thus may provide a multi-tasking imaging system at a reduced cost and with reduced components. The imaging system may capture multiple frames sequentially, and may elect (such as in a predetermined manner) the processing or treatment of the respective frames or sets of frames. The imaging system thus may focus or harness the processing power to a restricted set of criteria for one subset of frames, and to another restricted set of criteria for another subset of frames. The imaging system of the present invention thus may selectively focus or harness the image sensor capturing capabilities and the image processing power to enhance the image capturing and processing of different frames or sets of frames for different applications.

Although shown and described as a forward facing imaging sensor, it is envisioned that aspects of the present invention may be suitable for selectively capturing and/or processing image data with a rearward facing imaging sensor and control or image processor. For example, the rearward facing imaging system may be operable to function as a lane departure warning (LDW) system utilizing image processing of the images captured by a rearward facing imaging sensor or camera. The imaging system may include controls and/or circuitry for operating as such a lane departure warning system and thus may process the images to detect the lane markers and the like along the road surface, or the imaging system may provide image data to a separate image processor or microcontroller for processing the image data to detect the lane markers and the like along the road surface. The imaging system may utilize image processing techniques such as those described in U.S. patent application Ser. No. 10/427,051, filed Apr. 30, 2003, now U.S. Pat. No. 7,038,577; and/or Ser. No. 11/105,757, filed Apr. 14, 2005, now U.S. Pat. No. 7,526,103; and/or U.S. provisional application Ser. No. 60/607,963, filed Sep. 8, 2004 by Schofield for IMAGING SYSTEM FOR VEHICLE; and/or Ser. No. 60/638,687, filed Dec. 23, 2004 by Higgins-Luthman for OBJECT DETECTION SYSTEM FOR VEHICLE, which are hereby incorporated herein by reference. Optionally, the imaging system may selectively capture and process image data of the rearward facing image sensor to provide a back up aid function, such as by utilizing principles described in U.S. Pat. Nos. 5,550,677; 5,760,962; 5,670,935; 6,201,642; 6,717,610 and/or 6,757,109, and/or in U.S. patent application Ser. No. 10/418,486, filed Apr. 18, 2003, now U.S. Pat. No. 7,005,974, and/or in PCT Application No. PCT/US2003/036177, filed Nov. 14, 2003 and published Jun. 3, 2004 as International Publication No. WO 2004/047421, which are all hereby incorporated herein by reference.

The imager or imaging sensor 114 of the imaging system 110 may comprise an imaging array sensor or a pixelated imaging array, such as a multi-pixel array such as a CMOS sensor or a CCD sensor or the like, such as the types disclosed in commonly assigned U.S. Pat. Nos. 5,550,677; 5,670,935; 5,796,094; 5,877,897; 6,097,023; 6,498,620; and 6,690,268, and U.S. patent application Ser. No. 09/441,341, filed Nov. 16, 1999, now U.S. Pat. No. 7,339,149, which are hereby incorporated herein by reference, or such as an extended dynamic range camera, such as the types disclosed in PCT Application No. PCT/US2003/036177, filed Nov. 14, 2003 and published Jun. 3, 2004 as International Publication No. WO 2004/047421, which is hereby incorporated herein by reference. For example, the imaging sensor may comprise a CMOS camera, such as the OV7930 single chip CMOS color NTSC camera available from OmniVision Technologies Inc. of Sunnyvale, Calif. Such color cameras may have the performance characteristics identified above and may additionally provide RGB and/or YCrCb video signals. Preferably, the color video camera operates at a minimum illumination (3000 K) of less than about 5 lux at f1.2, more preferably of less than about 3 lux at f1.2, and most preferably less than about of less than about 2 lux at f1.2. Such CMOS imaging sensors typically may have a peak sensitivity in the near infrared range, such as at approximately 850 nm to 900 nm or thereabouts.

Such pixelated imaging sensors may include a plurality of pixels, with at least some of the pixels masked or covered with a particular color filter, such that the individual pixels function to capture a particular color, such as red, green and blue colors or the like, such as disclosed in U.S. Pat. Nos. 5,550,677; 5,670,935; 5,796,094; 6,097,023; and 6,498,620, referenced above. For example, the imaging sensor may comprise an individual blue or a green or a red color filter over each pixel element of the CMOS multi-pixel element array. The imaging sensor is thus operable to detect colors, which is useful in determining whether a detected object or item is a headlamp or a taillight, such as described in U.S. Pat. No. 5,796,094, referenced above.

Although described as a CMOS type camera, clearly other types of imaging arrays or imaging sensors or cameras may be implemented with the imaging system of the present invention. For example, the imaging sensor may comprise a CCD or other type of sensor, without affecting the scope of the present invention. Preferably, the selected imaging sensor has a low dark current and thus provides enhanced ruggedness and enhanced performance at higher temperatures. Optionally, the dark current (the current through the pixels when they are not sensing light) may be used to detect the temperature at the imaging sensor, such as described in U.S. patent application Ser. No. 11/105,757, filed Apr. 14, 2005, now U.S. Pat. No. 7,526,103; and/or U.S. provisional application Ser. No. 60/607,963, filed Sep. 8, 2004 by Schofield for IMAGING SYSTEM FOR VEHICLE, which is hereby incorporated herein by reference.

Optionally, a method or system may be implemented to transform a CMOS color imager from its individual color space into a standardized color protocol, such as the CIE color space, in order to enhance the identification of a detected object or light source. The Centre Internationale dEclairage (CIE) is an international organization that establishes methods for measuring color and that recommends standards and procedures for light and lighting, including colorimetry. The color standards for colormetric measurements are internationally accepted specifications that define color values mathematically. CIE defines color as a combination of three axes: x, y, and z. CIE color models are considered device independent because the colors should not differ, theoretically, from one output device to another if properly calibrated.

The CIE color spaces thus provide the foundation upon which device-independent color and color management are built. Device profiles, device calibration, and gamut mapping may also be needed for color management. A device profile describes a device's color capabilities including color gamut, color production method, and device operation modes. Device profiles are typically created by color imaging scientists using spectrophotometers, which are instruments that measure the relative intensities of light in different parts of the visible spectrum. The measurements are then used to produce the device profile, such as via various algorithms and the like. Device profiles are used by the color management software to translate color data from one device to another based upon an independent color space or system for ordering colors that respects the relationships or similarity among them.

The CMOS color imager of the imaging system of the present invention is used in an automotive environment where all the road scene objects of interest that may be typically encountered may be classified within the CIE Color System. Digital imaging systems represent color in any given number of ways. The transformation provides an easy method for the identification of CIE color. Classification of the various objects within the road scene can be enhanced using CIE color as well as other image processing methods to provide high confidence that any particular detected object or light source is correctly identified.

The transformation requires an initial characterization of the pixel output of the CMOS imager using four primary calibration targets and a spectroradiometer. The CMOS imager is used to measure the "color" of the calibrated targets. The calibrated targets are also measured using the spectroradiometer. The transformation yields a three by three matrix that is applied to the x, y, z values of the camera's output to provide CIE color. The CIE color of the detected object or light source may then be compared to the classifications or index of the various objects or light sources of interest to identify the detected object or light source.

Therefore, the present invention provides an imaging system that includes an imaging device and a control that is operable to selectively capture images and process image data to provide multiple functions or applications of a common image sensor and image processor. The imaging system may synchronize the settings of the image sensor with the processing techniques applied to the captured image data to optimize two or more functions of the imaging system. The present invention thus provides a multi-tasking capability to a common image sensor and image processor while providing enhanced capturing of the images and processing of the image data for the desired functions or applications.

Optionally, an imaging sensor or system of the present invention may be associated with an imaging and display system for displaying the captured images to the driver of the vehicle. In such display applications, a variety of display means or display devices may be utilized to visually convey information to the driver of the vehicle, without affecting the scope of the present invention. For example, and such as described in U.S. Pat. No. 6,477,464, which is hereby incorporated herein by reference, a text display may be provided and/or an iconistic display may be provided, such as a display readable through the interior rearview mirror reflective element itself. In this regard, use of a transflective or display on demand (DOD) type display (such as disclosed in commonly assigned, U.S. patent application Ser. No. 10/054,633, filed Jan. 22, 2002, now U.S. Pat. No. 7,195,381, and in U.S. Pat. Nos. 6,690,268; 5,668,663 and 5,724,187, the entire disclosures of which are hereby incorporated by reference herein), may be preferred. For example, a video display element or a video display screen or an information display element can be used (such as an elongated alphanumeric/multi-pixel/multi-icon display element and/or such as an LCD display or an emitting display element, such as a multi-pixel electroluminescent display or field emission display or light emitting diode display (organic or inorganic) or the like) which is disposed within the mirror housing of the interior mirror assembly of the vehicle, and located behind the mirror reflective element in the mirror housing, and configured so that the information displayed by the display element (that is positioned to the rear of the reflector of the mirror reflective element) is viewable by the driver through the mirror reflective element. Such a display can be accomplished by partially or wholly removing the reflector in the area of the display or, more preferably, by providing a display on demand type display, whereby the reflective element comprises a transflective element, as discussed below.

Note that other display locations are possible for display of the video image or information display, such as a text message or the like, to the driver or occupant of the vehicle. For example, a video image may be displayed on an LCD video screen of flip-down display (such as is disclosed in U.S. Pat. No. 6,690,268, incorporated above), or on a video screen incorporated into the rearview mirror assembly (such as the types described in U.S. patent application Ser. No. 10/964,512, filed Oct. 13, now U.S. Pat. No. 7,308,341, and/or in PCT Application No. PCT/US03/40611, filed Dec. 19, 2003 and published Jul. 15, 2004 as International Publication No. WO 2004/058540, which is hereby incorporated herein by reference). Optionally, for example, a video display located in the front instrument panel can be used, or a video display located in an overhead console (such as an overhead accessory module or system as described in PCT Application No. PCT/US03/40611, and published Jul. 15, 2004 as International Publication No. WO 2004/058540, which is hereby incorporated herein by reference) can be used, without affecting the scope of the present invention. Alternately, a low cost, multi-pixel display (such as the type disclosed in U.S. patent application Ser. No. 10/418,486, filed Apr. 18, 2003, now U.S. Pat. No. 7,005,974, which is hereby incorporated herein by reference), such as a low cost multi-pixel vacuum fluorescent display, a low cost multi-pixel organic light emitting diode (OLED), a low cost multi-pixel field emission display, or any other or similar multi-pixel light emitting display or the like may be utilized, without affecting the scope of the present invention.

Optionally, the imaging sensor and control, and optionally a display device and/or an audible alert device or speaker or the like, may include a display element positioned at a rear portion of the vehicle, such as at the rear window of the vehicle or the like, on which the captured image is projected, such as via a projector within the vehicle. The displayed or projected image may be viewed at the rear portion of the vehicle by the driver of the vehicle, such as by viewing the image in the rearview mirror or by turning to view the rearward image. The image thus may be projected as a reverse image or mirror image display depending on the particular application or desired viewing of the displayed/projected image.

Optionally, the display device and/or an audible alert device or speaker may be positioned at or in or near the interior rearview mirror assembly of the vehicle. The mirror assembly may comprise a prismatic mirror assembly, such as a prismatic mirror assembly utilizing aspects described in U.S. Pat. Nos. 6,318,870; 5,327,288; 4,948,242; 4,826,289; 4,436,371; and 4,435,042; and PCT Application No. PCT/US04/015424, filed May 18, 2004 and published Dec. 2, 2004 as International Publication No. WO 2004/103772; and U.S. patent application Ser. No. 10/933,842, filed Sep. 3, 2004, now U.S. Pat. No. 7,249,860, which are hereby incorporated herein by reference. Optionally, the prismatic reflective element may comprise a conventional prismatic reflective element or prism or may comprise a prismatic reflective element of the types, described in PCT Application No. PCT/US03/29776, filed Sep. 19, 2003 and published Apr. 1, 2004 as International Publication No. WO 2004/026633; U.S. patent application Ser. No. 10/709,434, filed May 5, 2004, now U.S. Pat. No. 7,420,756; and Ser. No. 10/993,302, filed Nov. 19, 2004, now U.S. Pat. No. 7,338,177; and U.S. provisional application Ser. No. 60/525,952, filed Nov. 26, 2003 by Lynam for MIRROR REFLECTIVE ELEMENT FOR A VEHICLE, which are all hereby incorporated herein by reference, without affecting the scope of the present invention. A variety of mirror accessories and constructions are known in the art, such as those disclosed in U.S. Pat. Nos. 5,555,136; 5,582,383; 5,680,263; 6,227,675; 6,229,319; and 6,315,421 (the entire disclosures of which are hereby incorporated by reference herein), that can benefit from or be implemented with the present invention.

Optionally, the interior rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; and/or 4,712,879, which are hereby incorporated herein by reference, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash, (1990), which are hereby incorporated by reference herein. The mirror assembly may include one or more displays, such as the types disclosed in U.S. Pat. Nos. 5,530,240 and/or 6,329,925, which are hereby incorporated herein by reference, and/or display-on-demand or transflective type displays, such as the types disclosed in U.S. Pat. Nos. 6,690,268; 5,668,663 and/or 5,724,187, and/or in U.S. patent application Ser. No. 11/021,065, filed Dec. 23, 2004, now U.S. Pat. No. 7,255,451; Ser. No. 10/528,269, filed Mar. 17, 2005, now U.S. Pat. No. 7,274,501; and/or Ser. No. 10/993,302, filed Nov. 19, 2004, now U.S. Pat. No. 7,338,177; Ser. No. 10/533,762, filed May 4, 2005, now U.S. Pat. No. 7,184,190; Ser. No, 11/226,628, filed Sep. 14, 2005 and published Mar. 23, 2006 as U.S. Publication No. US-2006-0061008; and/or Ser. No. 10/054,633, filed Jan. 22, 2002, now U.S. Pat. No. 7,195,381; PCT Application No. PCT/US03/29776, filed Sep. 9, 2003 and published Apr. 1, 2004 as International Publication No. WO 2004/026633 A2; and/or PCT Application No. PCT/US03/40611, filed Dec. 19, 2003 and published Jul. 15, 2004 as International Publication No. WO 2004/058540 A3, and/or U.S. provisional application Ser. No. 60/681,250, filed May 16, 2005; Ser. No. 60/690,400, filed Jun. 14, 2005; Ser. No. 60/695,149, filed Jun. 29, 2005, which are all hereby incorporated herein by reference.

Optionally, the image sensor and control, and optionally a display device and/or alert device, may be positioned at or in an accessory module or windshield electronic module of the vehicle, without affecting the scope of the present invention. The accessory module may comprise any type of accessory module or windshield electronics module or console, such as the types described in U.S. patent application Ser. No. 10/355,454, filed Jan. 31, 2003, now U.S. Pat. No. 6,824,281; and Ser. No. 10/456,599, filed Jun. 6, 2003, now U.S. Pat. No. 7,004,593, and/or U.S. Pat. Nos. 6,690,268; 6,250,148; 6,341,523; 6,593,565; and 6,326,613, and/or PCT Application No. PCT/US03/40611, filed Dec. 19, 2003 and published Jul. 15, 2004 as International Publication No. WO 2004/058540 A3, which are all hereby incorporated herein by reference.

Optionally, the imaging system may be selectively operable and switchable to provide the desired function and/or display to the driver of the vehicle. Such switching may occur in response to one or more user inputs in the vehicle, such as at the interior rearview mirror system of the vehicle or the like. The user inputs may be positioned at or near a display, such as along a perimeter region of a flip out or slide out video display of a mirror assembly or along a chin or bezel region of the mirror assembly, and may comprise buttons, switches, proximity sensors, touch sensors, or the like, without affecting the scope of the present invention. For example, the user inputs may comprise buttons or switches, such as user inputs of the types described in PCT Application No. PCT/US2003/036177, filed Nov. 14, 2003 and published Jun. 3, 2004 as International Publication No. WO 2004/047421, and/or PCT Application No. PCT/US04/015424, filed May 18, 2004 and published Dec. 2, 2004 as International Publication No. WO 2004/103772, which are hereby incorporated herein by reference, touch sensors or proximity sensing inputs or the like, such as sensors of the types described in U.S. Pat. Nos. 6,001,486; 6,310,611; 6,320,282; 6,627,918; and 5,594,222; and/or U.S. Pat. Publication No. 2002/0044065, published Apr. 18, 2002 by Quist et al., now U.S. Pat. No. 7,224,324; and/or U.S. patent application Ser. No. 10/933,842, filed Sep. 3, 2004, now U.S. Pat. No. 7,249,860; and/or PCT Application No. PCT/US03/40611, filed Dec. 19, 2003 and published Jul. 15, 2004 as International Publication No. WO 2004/058540 A3, which are hereby incorporated herein by reference, or may comprise inputs molded within the bezel of the mirror assembly, such as described in U.S. patent application Ser. No. 11/029,695; filed Jan. 5, 2005, now U.S. Pat. No. 7,253,723, and/or U.S. provisional application Ser. No. 60/535,559, filed Jan. 9, 2004 by Lindahl for MIRROR ASSEMBLY; Ser. No. 60/553,517, filed Mar. 16, 2004 by Lindahl et al. for MIRROR ASSEMBLY; Ser. No. 60/556,259, filed Mar. 25, 2004, which are hereby incorporated herein by reference, and/or other types of buttons or inputs at a bezel region, such as the types described in U.S. provisional application Ser. No. 60/690,401, filed Jun. 14, 2005 by Uken for MIRROR ASSEMBLY FOR VEHICLE, and/or Ser. No. 60/719,482, filed Sep. 22, 2005 by Uken for MIRROR ASSEMBLY WITH USER INPUTS, which are hereby incorporated herein by reference, or may comprise membrane type switches, such as described in U.S. patent application Ser. No. 11/140,396, filed May 27, 2005, now U.S. Pat. No. 7,360,932, and/or U.S. provisional application Ser. No, 60/575,904, filed Jun. 1, 2004 by Uken for MIRROR ASSEMBLY FOR VEHICLE; and Ser. No. 60/624,320, filed Nov. 2, 2004, which are hereby incorporated herein by reference; and/or the like, without affecting the scope of the present invention. The switching or inputs may control or adjust the control and/or imaging sensor, such as by utilizing the principles described above and in U.S. provisional application Ser. No. 60/614,644, filed Sep. 30, 2004 by Camilleri et al. for CAMERA DISPLAY SYSTEM, which is hereby incorporated herein by reference.

Therefore, the present invention provides an imaging and display system that includes an imaging device and a display device connected via video connections or communication links. The imaging device includes user inputs and the imaging and display system is operable to selectively control or adjust the imaging device in response to the user inputs. The imaging and display system is operable to communicate imaging signals from the imaging device to the display device and to communicate, camera control signals from the display device to the imaging device along common connections or wiring or communication links between the imaging device and the display device. The imaging and display system thus may provide various optional features or functions or modes without having to change or add wiring or connections between the imaging device and the display device.

Changes and modifications to the specifically described embodiments may be carried out without departing from the principles of the present invention, which is intended to be limited only by the scope of the appended claims as interpreted according to the principles of patent law.

What is claimed is:

1. A vision system for a vehicle, said vision system comprising:
   an imaging device having a field of view exterior the vehicle;
   a camera controller;
   a display device having a display element, said display device operable to display information for viewing by a driver of the vehicle;
   a display controller;
   wherein said camera controller and said display controller share a common processor;
   wherein said vision system is operable to adjust an image displayed by said display device in response to a signal from an auxiliary sensing system of the vehicle;
   a sensor operable to detect an object exterior the vehicle;

wherein said vision system, responsive to said object detection by said sensor, is operable to at least one of (a) provide enhanced imaging of the detected object by said imaging device, (b) provide enhanced processing of at least a portion of an image captured by said imaging device that corresponds to the region of the exterior scene at which an object is detected by said sensor, (c) adjust said display device to enhance displayed images of an object detected by said sensor and (d) adjust said display device to enhance display of at least a portion of an image upturned by said imaging device that corresponds to the region of the exterior scene at which the object is detected by said sensor; and wherein said display controller is operable to affect an image signal of said imaging device by disabling a video termination at said display device.

2. The vision system of claim 1, wherein said sensor comprises at least one of an ultrasonic sensor, a radar device, a sonar device, a laser sensing device, a lidar device and a laser scanning device.

3. The vision system of claim 1, wherein said imaging device comprises a video encoder.

4. The vision system of claim 1, wherein said display device is associated with one of (i) an interior rearview mirror assembly of the vehicle and (ii) an accessory module of the vehicle.

5. The vision system of claim 1, comprising at least one user input.

6. The vision system of claim 5, wherein said vision system is operable to adjust at least one function of said imaging device in response to actuation of said at least one user input.

7. The vision system of claim 5, wherein said at least one user input is disposed at said display device.

8. The vision system of claim 5, wherein said display controller affects an image signal of said imaging device in response to actuation of said at least one user input.

9. The vision system of claim 1, wherein said imaging device is operable to capture image data, and wherein said vision system is operable to at least two of (i) capture image data suitable for lane detection and process said captured lane detection image data in a manner that is suitable for lane detection, (ii) capture image data suitable for headlamp detection and process said captured headlamp detection image data in a manner that is suitable for headlamp detection and (iii) capture image data suitable for ambient light detection and process said captured ambient light detection image data in a manner that is suitable for ambient light detection.

10. The vision system of claim 1, wherein said vision system is operable to adjust said imaging device to at least two settings, and wherein said vision system is operable to process image data captured by said imaging device via at least two processing techniques for respective ones of said at least two settings.

11. A vision system for a vehicle, said vision system comprising:
an imaging device having a field of view exterior the vehicle;
a camera controller;
a display device having a display element, said display device operable to display information for viewing by a driver of the vehicle;
a display controller;
wherein said camera controller and said display controller share a common processor;
wherein said vision system is operable to adjust an image displayed by said display device in response to a signal from an auxiliary sensing system of the vehicle;
a sensor operable to detect an object exterior the vehicle;
wherein said sensor comprises at least one of an ultrasonic sensor, a radar device, a sonar device, a laser sensing device, a lidar device and a laser scanning device;
at least one user input, wherein said vision system is operable to adjust at least one function of said imaging device in response to actuation of said at least one user input;
wherein said vision system, responsive to said object detection by said sensor, is operable to at least one of (a) provide enhanced imaging of the detected object by said imaging device, (b) provide enhanced processing of at least a portion of an image captured by said imaging device that corresponds to the region of the exterior scene at which an object is detected by said sensor, (c) adjust said display device to enhance displayed images of an object detected by said sensor and (d) adjust said display device to enhance display of at least a portion of an image captured by said imaging device that corresponds to the region of the exterior scene at which the object is detected by said sensor;
wherein said display controller affects an image signal of said imaging device in response to actuation of said at least one user input; and
wherein said display controller is operable to affect said image signal by disabling a video termination at said display device.

12. The vision system of claim 11, wherein said imaging device is operable to capture image data, and wherein said vision system is operable to at least two of (i) capture image data suitable for lane detection and process said captured lane detection image data in a manner that is suitable for lane detection, (ii) capture image data suitable for headlamp detection and process said captured headlamp detection image data in a manner that is suitable for headlamp detection and (iii) capture image data suitable for ambient light detection and process said captured ambient light detection image data in a manner that is suitable for ambient light detection.

13. The vision system of claim 11, wherein said vision system is operable to adjust said imaging device to at least two settings, and wherein said vision system is operable to process image data captured by said imaging device via at least two processing techniques for respective ones of said at least two settings.

14. A vision system for a vehicle, said vision system comprising:
an imaging device having a field of view exterior the vehicle;
a camera controller;
a display device having a display element, said display device operable to display information for viewing by a driver of the vehicle;
a display controller;
wherein said camera controller and said display controller share a common processor;
wherein said vision system is operable to adjust an image display by said display device in response to a signal from an auxiliary sensing system of the vehicle;
a sensor operable to detect an object exterior the vehicle;
wherein said sensor comprises at least one of an ultrasonic sensor, a radar device, a sonar device, a laser sensing device, a lidar device and a laser scanning device;
wherein said vision system, responsive to said object detection by said sensor, is operable to at least one of (a) provide enhanced imaging of the detected object by said imaging device, (b) provide enhanced processing of at least a portion of an image captured by said imaging device that corresponds to the region of the exterior scene at which an object is detected by said sensor, (c) adjust said display device to enhance displayed images of an object detected by said sensor and (d) adjust said display device to enhance display of at least a portion of an image captured by said imaging device that corresponds to the region of the exterior scene at which the object is detected by said sensor;

wherein said imaging device is operable to capture image data, and wherein said vision system is operable to at least two of (i) capture image data suitable for lane detection and process said captured lane detection image data in a manner that is suitable for lane detection, (ii) capture image data suitable for headlamp detection and process said captured headlamp detection image data in a manner that is suitable for headlamp detection and (iii) capture image data suitable for ambient light detection and process said captured ambient light detection image data in a manner that is suitable for ambient light detection; and wherein said display controller is operable to affect an image signal of said imaging device by disabling a video termination at said display device.

15. The vision system of claim 14, comprising at least one user input.

16. The vision system of claim 15, wherein at least one of (i) said vision system is operable to adjust at least one function of said imaging device in response to actuation of said at least one user input and (ii) said display controller affects an image signal of said imaging device in response to actuation of said at least one user input.

* * * * *

UNITED STATES PATENT AND TRADEMARK OFFICE
CERTIFICATE OF CORRECTION

PATENT NO. : 8,483,439 B2
APPLICATION NO. : 13/481100
DATED : July 9, 2013
INVENTOR(S) : Joseph Camilleri, Joel S. Gibson and Kenneth Schofield It is certified that error appears in the above-identified patent and that said Letters Patent is hereby corrected as shown below:

In the Specification:

Column 1:
Line 11, "Ser. No," should be --Ser. No.--

Column 2:
Line 24, Delete "," after "to"
Line 33, Delete ";" after "display"

Column 3:
Line 33, Insert --the-- after "of"
Line 63, Insert --to-- after "and/or"

Column 4:
Line 4, Delete "," after "imaging"

Column 6:
Line 26, Delete "," after "or"
Line 27, "20e" should be --20c--
Line 27, Delete "," after "particular"

Column 9:
Line 31, Delete "," after "optional"
Line 53, Delete "," after "various"
Line 54, Delete "," after "to"

Column 11:
Line 33, Delete "," after "detection"
Line 36, Delete "." after "filed"

Signed and Sealed this
Twenty-seventh Day of May, 2014

Michelle K. Lee
*Deputy Director of the United States Patent and Trademark Office*

Line 40, Delete "," after "or"
Line 41, Delete "," after "response"

Column 12:
Line 23, Delete "." after "PCT"
Line 29, "at" should be --et--

Column 14:
Line 27, "application" should be --applications,--
Line 31, "application" should be --applications,--
Line 48, "No," should be --No.--

Column 17:
Line 32, Delete "," after "may"
Line 44, Delete "," after "may"
Line 51, "No," should be --No.--

Column 20:
Line 8, Delete "," after "to"
Line 24, Delete "," after "level"

Column 24:
Line 37, Delete "," after "types"

Column 25:
Line 3, "Wash," should be --Wash.--
Line 15, "No," should be --No.--

Column 26:
Line 20, "No," should be --No.--
Line 39, Delete "," after "communicate"

In the Claims:

Column 27:
Line 11, Claim 1, "upturned" should be --captured--

Column 28:
Line 56, Claim 14, "display" should be --displayed--